(12) United States Patent  
Dudkiewicz et al.

(10) Patent No.: US 7,367,043 B2  
(45) Date of Patent: Apr. 29, 2008

(54) SYSTEM AND METHOD FOR GENERATING METADATA FOR PROGRAMMING EVENTS

(75) Inventors: Gil Gavriel Dudkiewicz, San Francisco, CA (US); Dale Kittrick Hitt, San Jose, CA (US)

(73) Assignee: Meevee, Inc., Burlingame, CA (US)

( * ) Notice: Subject to any disclaimer, the term of this patent is extended or adjusted under 35 U.S.C. 154(b) by 0 days.

(21) Appl. No.: 09/991,807

(22) Filed: Nov. 16, 2001

(65) Prior Publication Data

US 2002/0092031 A1 Jul. 11, 2002

Related U.S. Application Data

(63) Continuation-in-part of application No. 09/793,294, filed on Feb. 26, 2001, and a continuation-in-part of application No. 09/793,322, filed on Feb. 26, 2001, and a continuation-in-part of application No. 09/793,357, filed on Feb. 26, 2001, and a continuation-in-part of application No. 09/793,479, filed on Feb. 26, 2001.

(60) Provisional application No. 60/249,179, filed on Nov. 16, 2000.

(51) Int. Cl.
*H04N 7/16* (2006.01)

(52) U.S. Cl. .......................... 725/138; 725/45; 725/46; 725/67; 725/91; 725/103; 725/114; 725/144; 707/2; 707/10

(58) Field of Classification Search ............... 725/45, 725/46, 67, 91, 103, 114, 138, 144; 707/2, 707/10

See application file for complete search history.

(56) References Cited

U.S. PATENT DOCUMENTS 4,908,707 A 3/1990 Kinghorn (Continued)

FOREIGN PATENT DOCUMENTS

EP 0774868 A1 5/1997

(Continued)

OTHER PUBLICATIONS

U.S. Appl. No. 60/264,868, Logan, filed Jan. 29, 2001.

(Continued)

*Primary Examiner*—Jason P. Salce
(74) *Attorney, Agent, or Firm*—Foley & Lardner, LLP

(57) ABSTRACT

Metadata for a programming event may be generated by receiving descriptive information and timing information for the programming event and analyzing this information to determine category goodness of fit scores for the programming event corresponding to categories of a classification hierarchy. The information is further analyzed to determine keywords associated with the programming event. The category goodness of fit scores and keywords may be stored along with time data and descriptive data for the programming event as metadata for the programming event. Goodness of fit scores may also be generated for the keywords. Related embodiments may pertain to a device implementing such processing. Keyword metadata may be generated using candidate keywords taken from descriptive data associated with the programming event. The candidate key words may be provided individually as inputs to a classification tool configured to generate goodness of fit scores for categories of a classification hierarchy. Keywords may then be selected from among the candidates based on their individual scores, and stored as part of the metadata for the programming event. The scores of the keywords may be stored in association with the keywords.

32 Claims, 18 Drawing Sheets

U.S. PATENT DOCUMENTS

| | | | |
|---|---|---|---|
| 5,223,924 A | 6/1993 | Strubbe | |
| 5,390,027 A | 2/1995 | Henmi et al. | |
| 5,410,344 A | 4/1995 | Graves et al. | |
| 5,434,678 A | 7/1995 | Abecassis | |
| 5,444,499 A | 8/1995 | Saitoh | |
| 5,534,911 A | 7/1996 | Levitan | |
| 5,552,833 A | 9/1996 | Henmi et al. | |
| 5,585,865 A | 12/1996 | Amano et al. | |
| 5,600,364 A | 2/1997 | Hendricks et al. | |
| 5,619,247 A | 4/1997 | Russo | |
| 5,657,072 A * | 8/1997 | Aristides et al. | 725/46 |
| 5,724,525 A * | 3/1998 | Beyers et al. | 705/40 |
| 5,726,702 A * | 3/1998 | Hamaguchi et al. | 725/55 |
| 5,758,257 A | 5/1998 | Herz et al. | |
| 5,758,259 A * | 5/1998 | Lawler | 725/45 |
| 5,767,893 A | 6/1998 | Chen et al. | |
| 5,798,785 A * | 8/1998 | Hendricks et al. | 725/46 |
| 5,818,441 A | 10/1998 | Throckmorton et al. | |
| 5,848,396 A * | 12/1998 | Gerace | 705/10 |
| 5,872,588 A | 2/1999 | Aras et al. | |
| 5,878,222 A | 3/1999 | Harrison | |
| 5,920,700 A | 7/1999 | Gordon et al. | |
| 5,924,090 A | 7/1999 | Krellenstein | |
| 5,945,988 A | 8/1999 | Williams et al. | |
| 5,973,683 A | 10/1999 | Cragun et al. | |
| 5,983,237 A * | 11/1999 | Jain et al. | 707/104.1 |
| 6,005,597 A | 12/1999 | Barrett et al. | |
| 6,005,631 A | 12/1999 | Anderson et al. | |
| 6,011,895 A | 1/2000 | Abecassis | |
| 6,061,056 A | 5/2000 | Menard et al. | |
| 6,064,952 A * | 5/2000 | Imanaka et al. | 704/9 |
| 6,088,722 A | 7/2000 | Herz et al. | |
| 6,138,147 A | 10/2000 | Weaver et al. | |
| 6,157,413 A | 12/2000 | Hanafee et al. | |
| 6,163,316 A * | 12/2000 | Killian | 345/721 |
| 6,177,931 B1 | 1/2001 | Alexander et al. | |
| 6,236,395 B1 * | 5/2001 | Sezan et al. | 345/723 |
| 6,240,378 B1 * | 5/2001 | Imanaka et al. | 704/9 |
| 6,286,005 B1 * | 9/2001 | Cannon | 707/100 |
| 6,295,092 B1 * | 9/2001 | Hullinger et al. | 348/468 |
| 6,408,437 B1 * | 6/2002 | Hendricks et al. | 725/132 |
| 6,425,128 B1 | 7/2002 | Krapf et al. | |
| 6,445,306 B1 * | 9/2002 | Trovato et al. | 340/825.24 |
| 6,463,428 B1 | 10/2002 | Lee et al. | |
| 6,486,920 B2 * | 11/2002 | Arai et al. | 348/563 |
| 6,560,678 B1 | 5/2003 | Weissman et al. | |
| 6,567,980 B1 * | 5/2003 | Jain et al. | 725/61 |
| 6,581,207 B1 * | 6/2003 | Sumita et al. | 725/46 |
| 6,614,987 B1 * | 9/2003 | Ismail et al. | 386/83 |
| 6,684,194 B1 * | 1/2004 | Eldering et al. | 705/10 |
| 7,036,138 B1 * | 4/2006 | Tash | 725/46 |
| 2002/0095676 A1 * | 7/2002 | Knee et al. | |
| 2002/0120925 A1 | 8/2002 | Logan | |

FOREIGN PATENT DOCUMENTS

| | | |
|---|---|---|
| JP | 2000175141 | 6/2000 |
| WO | WO 96/41495 A1 | 12/1996 |
| WO | WO 99/29108 | 6/1999 |
| WO | WO 01/73599 | 10/2001 |

OTHER PUBLICATIONS

U.S. Appl. No. 60/304,570, Logan, filed Jul. 11, 2001.
U.S. Appl. No. 60/336,602, Logan, filed Dec. 3, 2001.
U.S. Appl. No. 09/536,969, Logan et al., filed Mar. 28, 2000.
PCT International Search Report issued in International Application No. PCT/US02/36328 mailed Jun. 23, 2003.
"About ENPS" (excerpts from www.enps.com) (2003).
Requirements Series: R3 On Metadata Requirements (Normative), The TV-Anytime Forum, Apr. 7, 2003.
Excerpts from Nielsonmedia.com, May 17, 2004, 5 pages.
European Search Report dated Apr. 7, 2005—European Application No. 02791233.6.

* cited by examiner

```
<A name=125TERROR></A> <TABLE width="100%" bgColor=#fffff0 borderColorLight=#e0e0e0
border=1> <TBODY> <TR> <TD vAlign=top width="30%"> <IMG alt="script icon" hspace=5
src="NOON, Tuesday, 10-24-00_files/script.gif" align=left> <FONT size=+0> <B>INTRO
TERROR</B></FONT> <BR> <FONT size=-2> </A></FONT> </TD> <TD> <FONT size=-1>IN
WASHINGTON, THE PENTAGON HAS ISSUED A "THREAT CONDITION DELTA." <BR>THAT IS AN ORDER TO
U-S TROOPS TO BE ON THE HIGHEST ALERT, BECAUSE AN ATTACK-- IN THIS CASE A TERRORIST ATTACK--
COULD BE IMMINENT. <BR>THE ORDER AFFECTS TROOPS STATIONED IN TURKEY AND IN THE PERSIAN
GULF STATES OF BAHRAIN, AND QATAR <BR>THE ORDER COMES IN THE WAKE OF THREATS THE
PENTAGON SAYS U-S INTELLIGENCE RECEIVED AFTER THE ATTACK ON THE U-S-S COLE IN YEMEN.
<BR></FONT></TD></TR></TBODY></TABLE>
<A name=134WORKING_MOMS></A>  <TABLE width="100%" bgColor=#fffff0
borderColorLight=#e0e0e0 border=1> <TBODY> <TR> <TD vAlign=top width="30%"> <IMG alt="script
icon" hspace=5 src="NOON, Tuesday, 10-24-00_files/script.gif" align=left> <FONT
size=+0> <B>WORKING MOMS</B></FONT> <BR> <FONT size=-2> </FONT> </TD> <TD> <FONT
size=-1>IN OTHER NEWS, A NEW STUDY SHOWS THAT NEW MOTHERS ARE GOING BACK TO WORK MORE
QUICKLY THAN EVER. <BR>THE CENSUS BUREAU REPORTS THAT 59 PERCENT OF WOMEN WHO HAD
BABIES WERE BACK ON THE JOB WITHIN A YEAR, USUALLY ON A FULL-TIME BASIS. <BR>THAT'S UP
EIGHT PERCENT FROM TEN YEARS AGO. <BR>AND THE NUMBER OF CHILDREN AMERICAN WOMEN ARE
HAVING CONTINUES TO DECLINE: <BR>THE CENSUS FOUND EACH WOMAN ON AVERAGE NOW HAS ONE-
POINT-EIGHT CHILDREN. <BR>IN 19-76, AMERICAN WOMEN ON AVERAGE HAD THREE KIDS EACH.
<BR></FONT></TD></TR></TBODY></TABLE>
<A name=35SHUTTLE_></A> <TABLE width="100%" bgColor=#fffff0 borderColorLight=#e0e0e0
border=1> <TBODY> <TR> <TD vAlign=top width="30%"> <IMG alt="script icon" hspace=5
src="NOON, Tuesday, 10-24-00_files/script.gif" align=left> <FONT size=+0> <B>SHUTTLE
</B></FONT> <BR> <FONT size=-2></FONT> </TD> <TD> <FONT size=-1>AND THE SHUTTLE
DISCOVERY ASTRONAUTS ARE STILL STUCK IN SPACE WAITING FOR AN OPPORTUNITY TO RETURN TO
EARTH. <BR>FOR THE THIRD STRAIGHT DAY, THEY WILL DON THEIR RE-ENTRY SUITS AND TRY TO BRING
THE SHUTTLE HOME. <BR>HIGH WINDS AND RAIN ARE ONCE AGAIN PREVENTING A FLORIDA LANDING.
BUT THE PLAN IS TO BRING DISCOVERY TO CALIFORNIA FOR A DESERT TOUCHDOWN AT EDWARDS AIR
FORCE BASE AT 1:59PM OUR TIME. <BR></FONT></TD></TR></TBODY></TABLE>
```

```
// PG            |Talent|SLUG           |TM |TN |Shot   |Video  |Total| Out cue  |Back Time
///////////////////////////////////////////////////////////////////////////////////////////
 125TERROR       |      |INTRO TERROR   |   |   |2-shot |On Set |2:23 | 58:45 (:15)| 0:02:26a|
 134WORKING_MOMS |S/D   |WORKING MOMS   |   |   |2-shot |On Set |0:25 | 58:45 (:15)| 0:02:54a|
 35SHUTTLE       |      |SHUTTLE        |   |   |2-shot |On Set |0:26 | 58:45 (:15)| 0:03:33a|
 22WEATHER       |      |WEATHER        |   |   |2-shot |On Set |2:41 | 58:45 (:15)| 0:06:27a|
 161HOMETOWN_HERO|      |HOMETOWN HERO  |   |   |2-shot |On Set |0:51 | 58:45 (:15)| 0:07:21a|
 164SURPLUS      |      |SURPLUS        |   |   |2-shot |On Set |0:17 | 58:45 (:15)| 0:07:41a|
 160CRANES       |      |CRANES         |   |   |2-shot |On Set |0:22 | 58:45 (:15)| 0:08:06a|
 132SC_LIVE_WAGE |S/D   |SC LIVE WAGE   |   |   |2-shot |On Set |0:23 | 58:45 (:15)| 0:08:32a|
 135LOTTO_WINNERS|      |LOTTO WINNERS  |   |   |2-shot |On Set |0:53 | 58:45 (:15)| 0:09:26a|
```

Figure 5
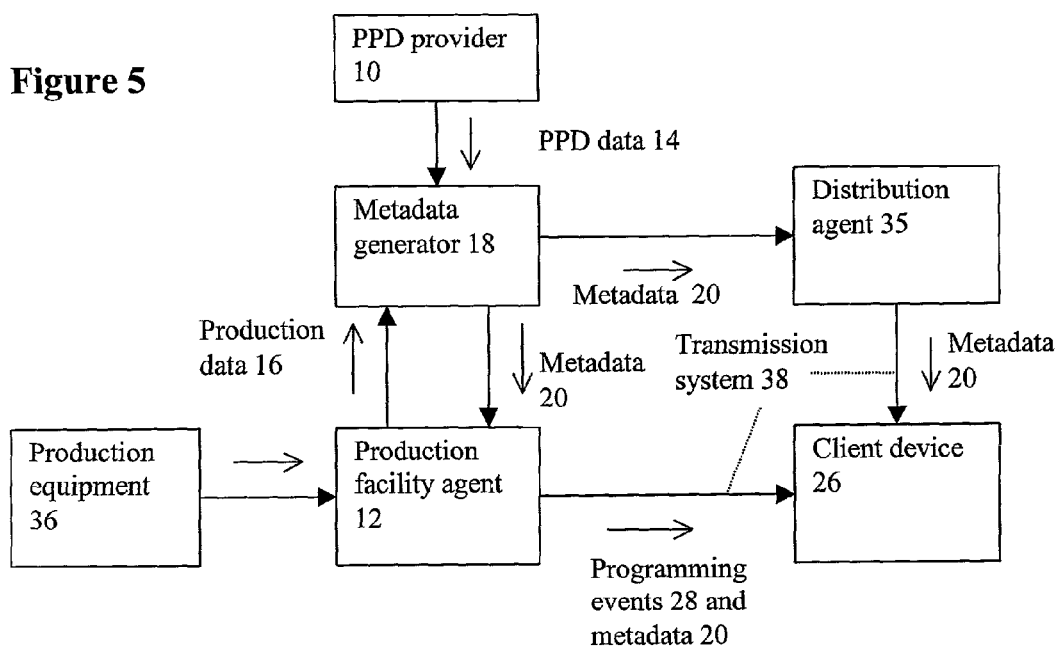
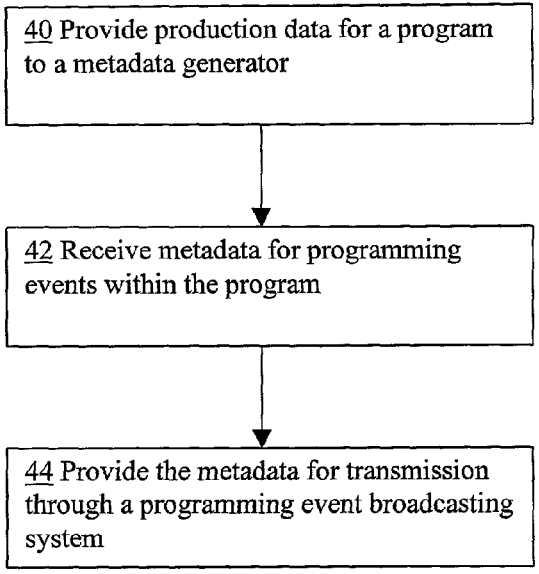
Figure 6

METADATA

| Field | Data |
|---|---|
| Program_ID | EP07071974-LAHOYASINGS |
| Program_Name | Channel 2 Nightly News at 11:00 |
| Program_Description | Local NFL Team Report; Buffalo Bills training camp opens; interview with coach; interviews with players |
| Program_Reduced_Description | Buffalo Bills training camp |
| Program_Date | 25 July 2000 |
| Program_Start_Time | 23:12:30 (HH:MM:SS) |
| Program_Duration | 00:02:10 (HH:MM:SS) |
| Channel_ID | 2 |
| Program_Type | Program segment |
| Program_TV_Rating | |
| Program_MPAA_Rating | |
| Message_Status | Retransmission of evening news segment |
| Category_List | News/Local/Sports/Football/NFL,100; Sports/Football/NFL/AFC/Bills,100; Sports/Football/NFL/Training_Camp,85; Sports/Football/NFL/News_Commentary,35 |
| Keyword_List | Football, 100; Buffalo, 75; Bills, 75; Training_Camp, 100 |

Figure 7

VIEWER PROFILE

| Field | Data |
|---|---|
| Profile_ID | PROF1 |
| Profile_Name | Football Fan |
| Profile_Description | Identifies programs about my favorite team. |
| Profile_Priority | 1 |
| Profile_Alerts_Per_Hour | 2 |
| Profile_Alert_Minutes_In_Advance | 2 |
| Profile_Activation_Time | 12:00:00 – 23:00:00 |
| Category_Scores | News/Local/Sports/Football/NFL,6; Sports/Football/NFL/AFC/Bills,10; Sports/Football/NFL/Training_Camp,10; Sports/Football/NFL/Commentary,4; ... |
| Keyword_List | Bills, Sports/Football/NFL, 10; ... |

Figure 13

| ...PE 1 Text Data | PE 2 Timing Data | PE 2 Text Data... |
|---|---|---|
Figure 20
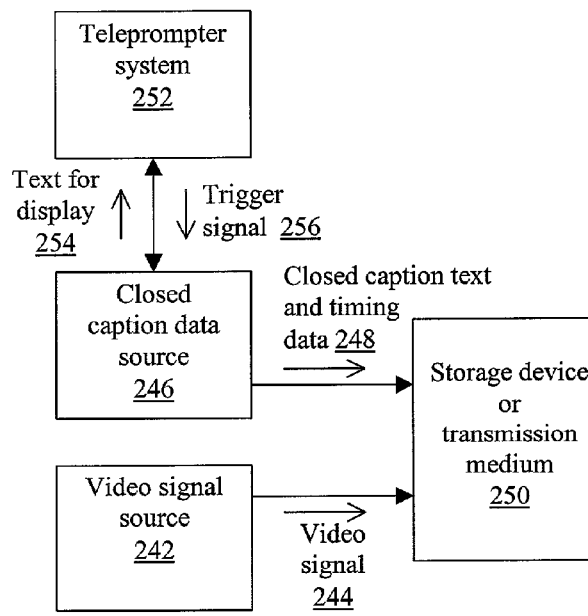
Figure 21
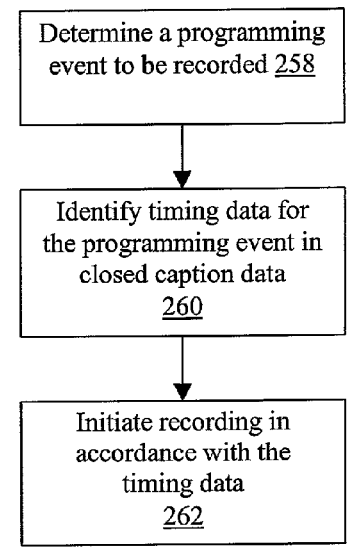
Figure 22

SYSTEM AND METHOD FOR GENERATING METADATA FOR PROGRAMMING EVENTS

CONTINUING DATA

This application claims priority under 35 USC §119(e) from U.S. Provisional Application Ser. No. 60/249,179, filed 16 Nov. 2000, the entirety of which is incorporated herein by reference. This application is a continuation in part of, and claims priority under 35 USC §120 from, U.S. application Ser. Nos. 09/793,294, 09/793,322, 09/793,357, and 09/793,479, each filed 26 Feb. 2001, the entirety of each of which is incorporated herein by reference.

This application is related to the following applications: Interactive System and Method for Generating Metadata for Programming Events, Ser. No. 09/991,741, filed concurrently herewith; System and Method for Determining the Desirability of Video Programming Events Using Keyword Matching, Ser. No. 09/992,686, filed concurrently herewith; System and Method for Providing Timing Data for Programming Events, Ser. No. 09/992,882, filed concurrently herewith; System and Method for Using Programming Event Timing Data in a Recording Device, Ser. No. 09/991,814, filed concurrently herewith; System and Method for Creating and Editing a Viewer Profile Used in Determining the Desirability of Video Programming Events, Ser. No. 09/992,414, filed concurrently herewith; and System and Methods for Determining the Desirability of and Recording Video Programming Events, Ser. No. PCT/US02/36328, filed concurrently herewith, each of which is incorporated herein by reference.

FIELD OF THE INVENTION

Embodiments of the invention relate to technologies that enable the identification of programming events of interest to a viewer.

BACKGROUND TECHNOLOGY

Television viewers are presently able to access hundreds of channels providing a multitude of programs, only a small fraction of which will be of interest to a given viewer. To assist the viewer in determining programs of interest, current commercially available reception devices such as televisions, analog cable receivers, and digital cable and satellite receivers typically provide a program guide function that allows the viewer to access a grid showing programs that will be available on various channels in upcoming time slots. Brief descriptions of programs may also be accessible. Such receivers may also allow the user to search for programs in basic categories such as news, sports, movies, etc.

Current commercially available television recording technology also provides similar tools. The present generation of digital video recording machines, which typically store video on a bulk storage device such as a hard disk drive, allow users to select programs for recording using an on screen program guide that provides keyword searching of program titles, a program time grid, and basic program categorization.

Although these devices provide tools that improve over devices of earlier generations, most conventional tools still require viewers to examine all upcoming programs to identify programs of interest. Thus, developers of the next generation of devices are focused on providing intelligence in receiving and recording devices for identifying programs of interest on behalf of the user. A number of U.S. patents describe different approaches to this problem.

U.S. Pat. No. 5,223,924 describes a device that downloads program descriptions. The program descriptions are viewed individually by a user, who indicates whether he is interested in each program. Based on the user's input, the device builds a database of keywords associated with the user's positive and negative preferences. This database is then used to identify upcoming programs that may be of interest to the user.

U.S. Pat. No. 5,410,344 describes a device that stores a viewer preference file that reflects the viewer's positive and negative preferences concerning various program attributes. The device uses the preference file to analyze content codes that describe attributes of available programs, and presents a program to the user based on the analysis. Programs are ranked using a neural network thresholding method.

U.S. Pat. No. 5,434,678 and its related patents describe a video retrieval system in which individual portions of scenes within a video are rated in accordance with a rating system and a version of the video is presented by selecting the segments that are acceptable based on a user's content preferences. Similar technology is described in U.S. Pat. No. 5,717,814 and its related patents.

U.S. Pat. No. 5,444,999 describes a device that tracks the viewing habits of a user and builds a weekly viewing trend. The device notifies the viewer when the television is tuned to different channel in conflict with the viewing trend.

U.S. Pat. No. 5,534,911 describes a system in which a viewer builds a personal profile that is then used to analyze data describing available programs. Programs are selected based on the analysis and are made available on a personalized virtual channel. The viewer is also enabled to select from among programs that are ranked in accordance with the profile. The specific manner in which program analysis is performed is not described.

U.S. Pat. No. 5,585,865 describes a system that searches for a genre code in broadcast signals in accordance with a specified program genre. If more than one signal contains the desired genre code, the system displays the channel with the greatest display history.

U.S. Pat. No. 5,619,247 describes a video recording device that selects programs for storage based on predefined user preferences, and allows a user to view the stored programs on a pay-per-view basis.

U.S. Pat. No. 5,767,893 describes a system that uses content based filtering for identifying video programs to be stored. The specific manner in which content is filtered is not described.

U.S. Pat. No. 5,878,222 describes a system that monitors channel data describing contents of available channels and arbitrates access to display or storage resources based on a user profile.

U.S. Pat. No. 5,945,988 describes a system that monitors the programs viewed by a current viewer and determines the identity of the current viewer using stored viewer profiles. The system may then use the viewer profile to analyze metadata describing upcoming programs to identify programs for viewing or recording. The specific manner in which the metadata analysis is performed is not described.

U.S. Pat. No. 6,088,722 describes a system in which a user profile is compared to program content profiles to generate an agreement matrix for each program. The agreement matrixes are used to select a program for presentation to the viewer. Agreement matrixes may also be generated at a server end using profiles for multiple viewers to select programs to be made available from the server.

SUMMARY OF THE DISCLOSURE

One shortcoming of the conventional technology as described above is that programs must be evaluated on a whole-program basis. However, many programs address diverse subjects, some of which will be of interest to a particular viewer and some of which will not. Embodiments of the invention may address this problem through devices and processes for generating metadata for individual program segments, thus allowing program segments to be treated as individual programming events that can be individually evaluated by the user or by user equipment. Related embodiments of the invention are applicable to programs such as news broadcasts that are multi-segmented and are typically not described in detail in conventionally available information sources because their contents are typically not known until shortly before broadcast. In accordance with embodiments of the invention, the production data used to produce such programs may be processed to generate metadata for the individual segments of the program and to distribute that metadata to consumers in advance of the airing of the program.

A further shortcoming of the conventional technology is that program classification is limited to broadly defined subject categories that are typically not easily compared to an individual viewers' personal tastes. For example, conventional technology may be capable of classifying programs as being within the category of "sports." However, for the viewer who is only interested in a particular sport, or a particular team, such classification is not effective in identifying programs of particular interest. Embodiments of the invention may address this problem through the use of a content classification hierarchy for classifying the content of programming events and for defining viewer's particular interests. The classification hierarchy is comprised of trees of subject categories of increasing specificity. This allows programming events to be classified with a previously unattainable degree of specificity, and allows viewer preferences to be expressed with equal specificity, both to emphasize particular categories of interest and to exclude categories not of interest. For example, rather than simply being enabled to specify interest in "sports", a viewer may specify that he is interested in football and tennis but not basketball or baseball, and may further express interest in particular football teams. Thus, devices may evaluate programming events that are rated according to the classification hierarchy, using viewer profiles defined according to the same classification system, and the resulting evaluations reflect actual user preferences much more accurately than if conventional general categories were used. Further, among multiple programs that are evaluated as being of interest to a viewer, the degree of specificity of the matches provides a manner of ranking those programs based on viewer preferences.

The use of hierarchical classification as described above enables intelligent identification of programming events that will be of particular interest to a given viewer. This intelligence may be implemented to automatically record programming events of interest, to alert a viewer of upcoming programming events of interest, to automatically display programming events of interest as they become available, or to selectively provide programs to the viewer. When this intelligence is coupled with metadata describing individual program segments as described above, it becomes possible to provide the viewer with a truly personalized viewing experience, from which all uninteresting subject matter has been eliminated through deep content specific filtering at the program segment level.

Further embodiments of the invention may combine the use of a content classification hierarchy with keywords for further characterizing programming events. Keywords may be given scores to characterize the degree to which they are descriptive of the programming event. In some embodiments, a keyword may be associated with a category of a classification hierarchy in a device that analyzes programming events to more precisely indicate the manner in which the keyword characterizes the subject matter of interest to the viewer. Related embodiments of the invention may therefore evaluate programming events using a combination of keyword matching and category matching.

Further embodiments of the invention may utilize interactive processes whereby personnel involved in the production of a programming event are enabled to participate in the generation of metadata for the programming event through an interactive process, whereby preliminary metadata produced by a system is either approved or edited to reflect the judgment of the production personnel as to various aspects such as the categories used to described the programming event, scores associated with the categories, keywords and their scores and category associations, and a title for the programming event.

Further embodiments of the invention may utilize timing data that is inserted in a closed caption data stream to mark at least the beginnings of programming events with precision so that a recording device is enable to determine the beginning of the programming event. The timing data may be created at the time that the rest of the closed caption data is created for the programming event, and closed caption data including such timing data may be synchronized to the programming event through triggering by a teleprompter system. A recording device may use the timing data to initiate, pause, un-pause and terminate recording. Related embodiments may incorporate such timing data in the video signal itself.

In accordance with one embodiment of the invention, metadata for a programming event may be generated by receiving descriptive information and timing information for the programming event and analyzing this information to determine category goodness of fit scores for the programming event corresponding to categories of a classification hierarchy. The information may be further analyzed to determine keywords associated with the programming event. The category goodness of fit scores and keywords may be stored along with time data and descriptive data for the programming event as metadata for the programming event. Goodness of fit scores may also be generated for the keywords. Related embodiments may pertain to a device implementing such processing.

In accordance with a further embodiment of the invention, metadata for a programming event may be generated using candidate keywords taken from descriptive data associated with the programming event. The candidate key words may be provided individually as inputs to a classification tool configured to generate goodness of fit scores for categories of a classification hierarchy. Keywords may then be selected from among the candidates based on their individual scores, and stored as part of the metadata for the programming event. The scores of the keywords may be stored in association with the keywords.

The following description of various embodiments discloses a variety of additional features that may be implemented in conjunction with the various embodiments summarized above and in further combinations that will be apparent to those having ordinary skill in the art.

BRIEF DESCRIPTION OF THE DRAWINGS

The invention may be better understood with reference to the following figures. The components in the figures are not necessarily to scale, emphasis instead being placed upon illustrating the principles of the embodiments of invention described in conjunction therewith.

FIG. 3 illustrates an example of production data comprising HTML script data produced by a conventional production application;

FIG. 4 illustrates an example of production data comprising rundown data produced by a conventional production application;

FIG. 5 illustrates a system for providing metadata and programming events to a client device in accordance with an embodiment of the invention;

FIG. 6 illustrates a process in a system such as the system shown in FIG. 5;

FIG. 7 illustrates metadata in accordance with an embodiment of the invention;

FIG. 13 illustrates a viewer profile in accordance with an embodiment of the invention;

FIG. 20 shows timing data included in a closed caption data stream in accordance with a preferred embodiment of the invention;

FIG. 21 shows a system for producing closed caption data in accordance with a preferred embodiment of the invention;

FIG. 22 shows a process in a client device utilizing closed caption timing data in accordance with a preferred embodiment of the invention;

DESCRIPTION OF PREFERRED EMBODIMENTS

In the following description, details of preferred embodiments and certain alternative embodiments in accordance with the invention are set forth. However, it will be apparent to those of ordinary skill in the art that alternative embodiments of the invention may be implemented using only some of the features of these embodiments, and using alternative combinations of the features of these embodiments. While various operations may be described herein in a particular order and as discrete tasks, the order of description should not be construed to imply that the tasks involved in those operations must be performed in the order in which they are presented or that those tasks must be performed discretely. Further, in some instances, well known features are omitted or generalized in order not to obscure the description. In this description, the use of phrases such as "an embodiment," "embodiments," "preferred embodiments," "alternative embodiment" and so forth do not necessarily refer to the same embodiment or all embodiments, although they may.

The following description employs the terms "program," "program segment" and "programming event." These terms are used to describe different but related concepts. The term "program" is used in the conventional sense of a video program such as a television program. For purposes of this description, a program comprises one or more "program segments" that pertain to different subjects and therefore can stand on their own as complete or individual viewing experiences. Examples of programs that typically consist of a single programming segment are movies, sit-coms, and sporting events. Examples of programs that are typically comprised of multiple program segments are news broadcasts, news magazine shows that present multiple feature stories, sports highlight shows, music video shows, informational shows, home shopping shows, and variety shows.

The term "programming event" is used in this description to describe a distinct video production presentation that pertains to a particular subject and therefore stands on its own as a complete or individual viewing experience. Therefore, a given programming event may be a segment of a program, or it may be a whole program if that program consists of only one program segment.

Figure 1:
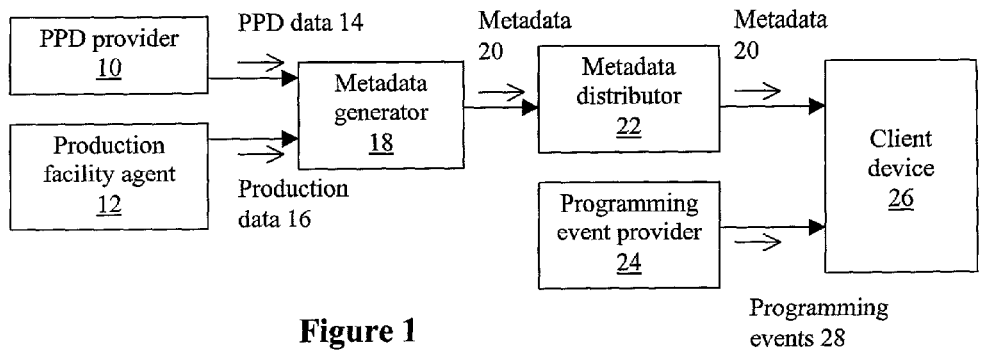
FIG. 1 illustrates a system for providing metadata and programming events to a client device in accordance with an embodiment of the invention.

FIG. 1 provides an overview of a programming event distribution system in accordance with embodiments of the invention. Referring to FIG. 1, a metadata generator 18 generates metadata 20 that is descriptive of a video programming event. The metadata generator 18 is typically implemented as a computing device including a processor or processors to execute programming instructions and memory coupled to the processor(s) and containing programming instructions for instantiating a metadata generator system, details of which are described below. The metadata 20 is provided by a metadata distributor 22 to a client device 26 maintained by a viewer. The client device 26 also receives programming events 28 from a programming event provider 24. In various embodiments, the metadata distributor 22 and programming event provider 24 may be a single entity such as a television broadcasting station or a cable or satellite television provider. In other embodiments, the metadata distributor 22 and the programming event provider 24 may be separate entities. For example, the metadata distributor 22 may be an internet server, whereas the programming event provider 24 may be a television broadcasting station or a cable or satellite television provider. The metadata 20 provided by the metadata generator 18 is typically received by the client device 26 in advance of corresponding programming events 28 to allow sufficient time for processing of the metadata in order to evaluate the desirability of upcoming programming events to the viewer.

The metadata generator 18 generates metadata 20 that describes programming events in a standard format that may be processed by the client device 26. Metadata typically comprises delimited data associated with fields in a generic metadata format, and typically includes at least data describing the subject of a programming event and data describing the time and duration of the programming event.

The metadata generator 18 may receive as input conventional program descriptive data (PDD) data 14 that is provided by a commercial PDD provider 10. Current providers of conventional PDD data are Tribune TV, TV Data, and TV Guide. The conventional PDD data describes television programs through information such as the program title, program start time, and program duration. PDD data may also include a program subject description if the program is one that is produced, or capable of being described, significantly in advance of its transmission. Typical examples of programming events for which PDD data contains subject descriptions include movies, sit-coms, and sporting events.

The metadata generator 18 may also receive production data 16 from a production facility agent 12 that obtains the production data from production equipment of a production facility. The production facility agent 12 is typically implemented as a computing device including a processor or processors to execute programming instructions and memory coupled to the processor(s) and containing programming instructions for instantiating a production facility agent system, details of which are described below. The production facility agent is preferably implemented on the production facility equipment so as to cooperate with the production facility software to obtain production data. Production data 16 provided by the production facility agent 12 generally includes data that is used in the production of a program, such as scripts, cue sheets, schedules, rundowns, closed caption text, teleprompter text, editing information, as so forth. Unlike conventional PDD data, production data used in accordance with the invention includes descriptive information (scripts, segment titles, segment descriptions, etc.) that is associated with timing information, thus enabling individual program segments within a program to be identified and individually described with respect to both their subjects and their times and durations. Thus, production data enables the generation of metadata for individual segments of programs, and as a result, program segments such as individual news stories, variety show skits and so forth may be individually analyzed and provided with their own metadata.

Production data is typically stored in computer systems and may exist in a variety of formats. Examples of conventional software applications that generate production data include the Associated Press Electronic News Production System (ENPS), AVID iNEWS NRCS, Avstar, and NewsCenter production software. Some such systems may conform to the Media Object Server (MOS) protocol, which is commonly used in production facilities to provide control of production facility equipment, such as transmission of script data to closed caption generation devices or teleprompter devices.

FIG. 3 shows an example of production data generated by the conventional ENPS system. The production data of FIG. 3 includes script data that is formatted as HTML code. Within the HTML code are individual sections corresponding to individual segments of a news broadcast. These segments are demarcated by tags having the format <A name=_____>, examples of which are highlighted in FIG. 3 for purposes of illustration. FIG. 4 shows a further example of production data generated by the conventional ENPS system. The production data of FIG. 4 comprises "rundown" data that provides a duration and ending time of individual segments within a news broadcast. The rundown data of FIG. 4 is derived from script data, with the timing for each segment of the program being calculated using an average read rate that is specific to the person reading the script for that segment. The rundown data of FIG. 4 is one example of rundown data that may be derived from script data, and in alternative forms the rundown data may include any other information from the script data.

It will be seen by comparison of FIGS. 3 and 4 that a common set of identifiers is used for identifying segments in the script data and in the rundown data. For example, the segment identified as "125TERROR" in the HTML script data can be seen in the rundown data to have a total time of 2:23 and an ending time of 2:26 into the news broadcast. Although the data in FIGS. 3 and 4 pertain to a program in which individual segments are described by single sections in the HTML data and rundown data, other programs may have individual segments that are described by multiple sections in the HTML data and rundown data, for example, when the segment consists of multiple distinct "live" and video portions. Thus the production data of FIGS. 3 and 4 is meant to be exemplary and not descriptive of all production data. Further, the production data of FIGS. 3 and 4 is representative only of data produced by one conventional production system, and a variety of other data formats will be known to those familiar with video production applications.

Since production data may exist in a variety of types and formats, it is preferable that the metadata generator 18 includes a production data standardization agent that receives production data from the production facility agent 12 in its various native formats and processes the production data 16 into a standardized delimited form. Alternatively, the production facility agent 12 may provide standardization functions. In the metadata generator 18, the production data 16 is preferably processed together with any available PDD data to generate metadata for individual programming events.

Figure 2:
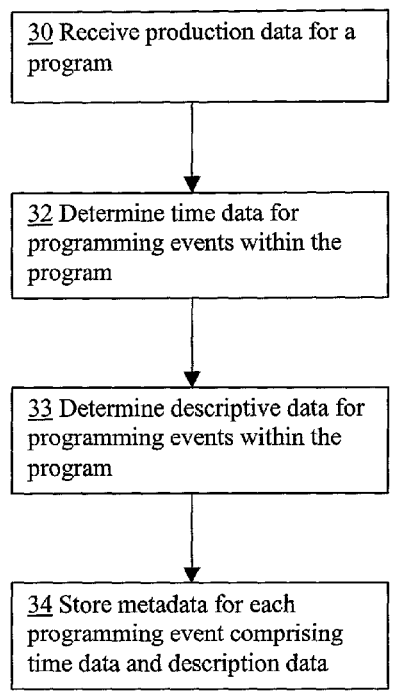
FIG. 2 illustrates a process in a system such as the system shown in FIG. 1.

Processing performed in a metadata generator in accordance with embodiments of the invention is illustrated in FIG. 2. For purposes of illustration, the tasks performed in the process of FIG. 2 will be related to the production data of FIGS. 3 and 4. Initially, the metadata generator receives production data for a program (30). The production data includes timing data and descriptive data for the program, such as is contained in the HTML script data and rundown data of FIGS. 3 and 4. The received production data may be processed to conform to a standard delimited format, for example, by tagging using an appropriate set of XML tags. Referring to FIGS. 3 and 4, the HTML data of FIG. 3 may be parsed into script data for individual segments by examining the contents of delimiting tags such as the <A name=_____> tag and extracting all text data associated with the same or related identifiers. Similarly, the rundown data may be parsed into rundown data for individual segments by searching for delimiting data or characters and extracting Total and Back Time data associated with the same or related identifiers.

The production data is then processed to determine time data of programming events within the program (32). Time data is data that enables determination of when the segment begins and ends, and may comprises beginning and ending times, a beginning time and duration, or an ending time and duration. Referring to the rundown data of FIG. 4, time data for segments may be determined through reference to the Total time and Back time associated with each identifier. For example, if the program represented by FIG. 4 is a 12 noon news program, the ending time of the segment may be determined by adding the latest Back Time for the segment to the 12 noon start time of the program, and the starting time may be determined by subtracting the Total time from the ending time. The production data is also processed to determine descriptive data for each programming event (33). This may be done before, after, or contemporaneously with the determination of time data. Descriptive data may be determined through reference to script data as shown in FIG. 3. For example, keywords and descriptive phrases may be extracted from the script data. Metadata for the programming events is then generated and stored (34). The metadata for each programming event comprises at least time data and descriptive data. PDD data and other types of production data may also be processed to generate time data and descriptive data.

Although the process of FIG. 2 was described as occurring within a metadata generator, in alternative embodiments the task of processing the production data into a standard delimited format for individual programming events may be performed by the production facility agent. In such embodiments, the production data is provided to the metadata generator in a standard delimited form, such as an XML document.

As described with respect to FIG. 1, metadata may be provided to consumers by a provider of programming events or by an independent metadata distributor. FIG. 5 illustrates an embodiment of the system illustrated in FIG. 1 in which programming events occurring within a multi-segment program such as a live local news broadcast are provided through a transmission system in common with the programming events. In this embodiment, a metadata generator 18 receives production data 16 from a production facility agent 12 that obtains production data from production equipment 36 in the production facility where the program is produced. The metadata generator 18 may be local or remote with respect to the production facility agent 12. In typical implementations, the metadata generator 18 is connected to the production facility agent 12 through a data network such as a LAN, WAN, or the internet. The metadata generator 18 may also receive PDD data 14 from an PDD provider 10. PDD data may likewise be received through a data network. The metadata generator 18 generates metadata 20 for each segment of the program from the production data, and optionally also from the PDD data. Metadata 20 for each programming event within the program may then be provided from the metadata generator 18 to the production facility agent 12, where it may be provided for transmission in common with programming events through a transmission system 38, such as RF airwaves or cable or satellite distribution systems, for reception by a client device 26. The metadata may then be transmitted to client devices, in the case of a production facility agent at a broadcast production facility location such as a local television station. Alternatively, the metadata may be provided to a distribution agent 35 that transmits the metadata through a transmission system 38 independently of the transmission of programming events from the production facility. The distribution agent may be located, for example, at a cable system head end.

A variety of coding standards may be used for encoding the metadata, such as the Harris Communication, Divicom, and NDS standards. Metadata may be transmitted in the vertical blanking interval of the video signal. Alternatively, where programming events are broadcast using MPEG-2 digital video, the metadata may be encoded in the text portion defined by the MPEG-2 standard. In cable televisions applications, it is preferable to transmit the metadata by out of band signaling, such as by using the separate band reserved for data transmission to a separate tuner of the cable receiver, as is conventionally used for services such as viewing authorization. In satellite television applications, it is preferable to provide the metadata by in band multiplexing.

The metadata for a given programming event is preferably transmitted sufficiently in advance of corresponding programming events to allow time for processing of the metadata by client devices. However, it may be desirable to limit the amount of advance time where client metadata storage capacity is limited. For example, in the case of programs having a large number of constituent programming events, such as news programs, it may be preferable to send metadata no more than one hour in advance of the program.

Processing occurring in the production facility agent of FIG. 5 is described in FIG. 6. In accordance with FIG. 6, the production facility agent provides production data for a program to a metadata generator (40). The production data typically includes descriptive information that is associated with timing information, such as the data illustrated in FIGS. 3 and 4. The production facility agent then receives metadata for individual programming events within the program (42). The production facility agent then provides the metadata for transmission through a programming event transmission system (44). The metadata may encoded using an encoding standard such as described above.

FIG. 7 shows an example of a logical organization of metadata for a programming event in accordance with preferred embodiments of the invention. The illustrated metadata describes a segment of a local news broadcast relating to an NFL team. The metadata is comprised of delimited descriptive data associated with fields of a generic metadata format. A Program_ID field provides a unique identifier for each programming event. A Program_Name field provides the name of the program with which the programming event is associated. A Program_Description field provides a description of the programming event, and a Program_Reduced_Description field provides a shortened description or "gist" of the programming event. Fields for Program_Date, Program_Start_Time and Program_Duration provide information identifying when and for how long the programming event is aired. A Channel_ID field identifies the channel on which the programming event will be received. A Program_Type field describes the type of programming event, such as a program, a program segment, or a movie. Program_TV_Rating and Program_MPAA_Rating fields provide ratings assigned to the program by rating services. A Message_Status field indicates whether the programming event is a first transmission, a retransmission, or an updated transmission. A Category_List field provides goodness of fit scores for the programming event with respect to categories in a classification hierarchy as described further below. A Keyword_List field contains keywords describing the subject matter of the programming event and may further contain goodness of fit scores for each keyword. The metadata is preferably formatted in a standard delimited format, for example, as an XML document using appropriate tags.

Figure 8:
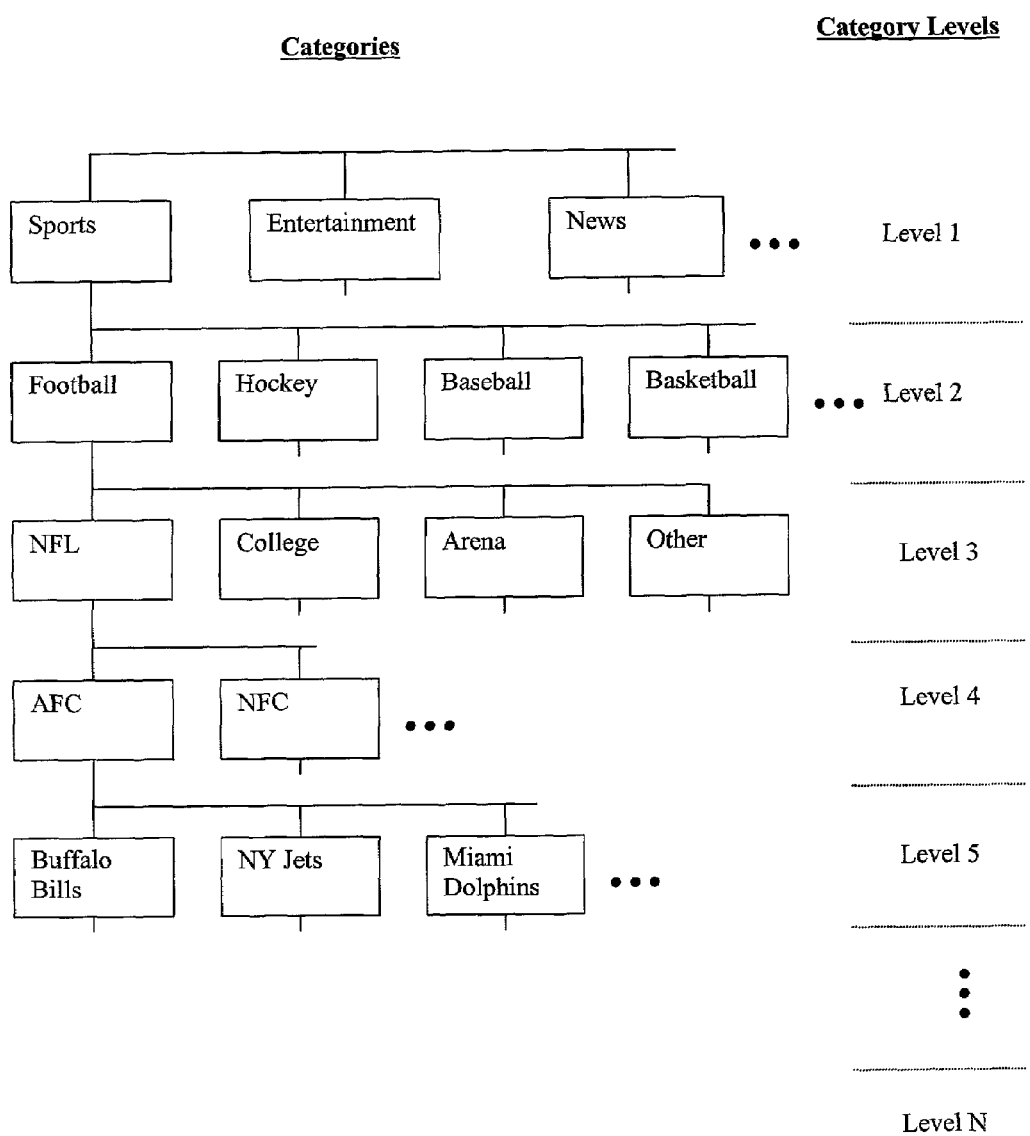
FIG. 8 illustrates a portion of a classification hierarchy in accordance with an embodiment of the invention.

The classification hierarchy with respect to which the programming event is scored comprises a hierarchy of subject categories. FIG. 8 illustrates a portion of an exemplary classification hierarchy in accordance with embodiments of the invention. At the top level of the hierarchy are general subject categories such as Sports, Entertainment, News, etc. Extending from each of the top level categories is a tree of more specific subject categories that fall within the top level category. FIG. 8 particularly illustrates a branch within the hierarchy in which Football is one of several categories within Sports, NFL is one of several categories within Football, AFC is one of several categories within NFL, and Buffalo Bills is one of several categories within AFC.

In the classification hierarchy of FIG. 8, the categories are shown as being organized in common ordinal levels, such that all categories at the top level of the hierarchy are at Level 1, all categories depending from Level 1 categories are at Level 2, and so forth. Embodiments of the invention may treat the common ordinal level of a category as being representative of that category's specificity relative to other categories of the classification hierarchy. However, since the degree of specificity of categories at a given ordinal level may vary among branches of the hierarchy, alternative embodiments may represent specificity in other manners. For example, each category may be assigned individual specificity scores, or all categories depending from a given category in the hierarchy may be commonly assigned a particular specificity score.

Figure 9:
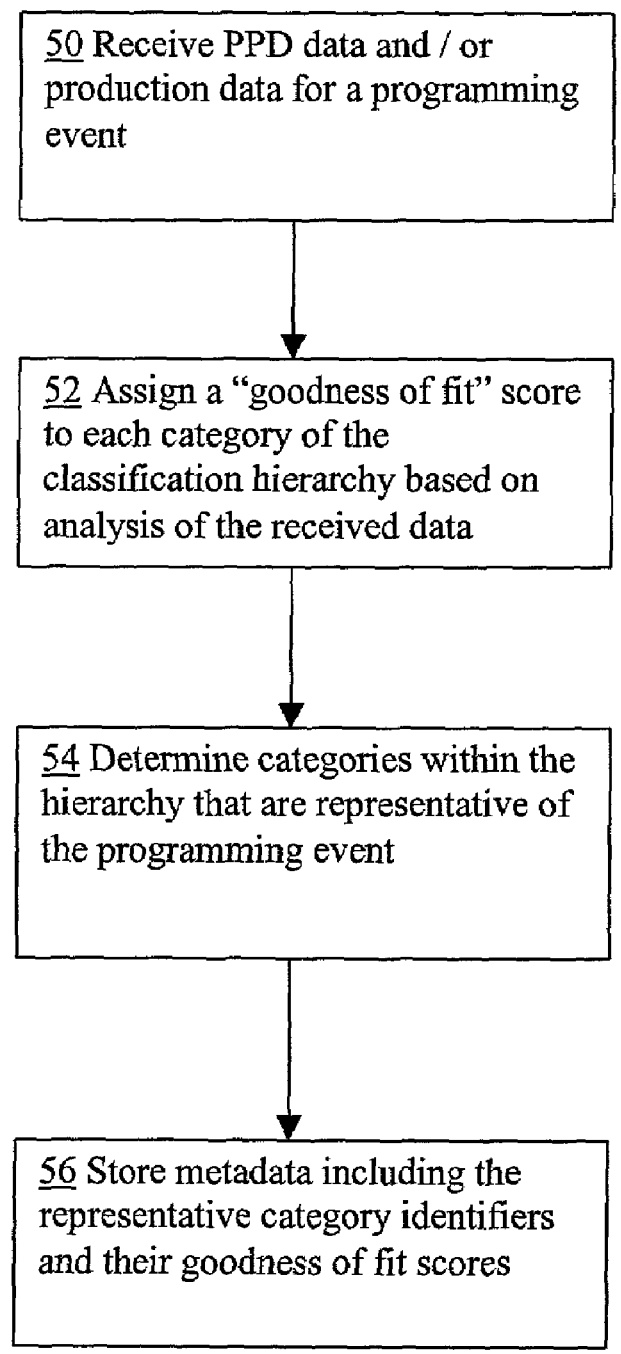
FIG. 9 illustrates a process for generating metadata in accordance with an embodiment of the invention.

In accordance with preferred embodiments of the invention, metadata generators such as those of FIGS. 1 and 5 produce metadata such as shown in FIG. 7 by processing descriptive data concerning a given programming event to classify the subject of the programming event using a classification hierarchy such as the one shown in FIG. 8. An example of processing performed by a metadata generator to produce metadata for a programming event in accordance with an embodiment of the invention is illustrated in FIG. 9. Initially, the metadata generator receives data for analysis that relates to a programming event (50). The received data may include PDD data and production data. Where the received data is production data, that data is preferably processed by a standardization agent that converts the production data to a standard delimited format for further processing. The data may also be parsed to determine individual programming events within a program. The data is then analyzed and a goodness of fit score for the programming event is assigned with respect to each category of the classification hierarchy (52). A goodness of fit score indicates how well the particular category describes the subject matter of the programming event. Goodness of fit scores may be generated using an appropriately configured classification application. For example, the InterMedia media searching tool produced by Oracle Corporation, or the K2 classification tool produced by Verity Corporation, may be configured to define a thesaurus reflecting words, phrases and concepts associated with the categories of the classification hierarchy, such that PDD and production data for a programming event may be searched with respect to each category of the hierarchy to generate a list of matched categories with associated confidence scores in a range from 1% to 100%. The confidence score for each matched category is used as that category's goodness of fit score, and categories having no match are treated as having goodness of fit scores of zero.

After assigning goodness of fit scores (52), the metadata generator determines a set of categories within the hierarchy that are representative of the programming event (54). In the preferred embodiment, the metadata generator first determines for each branch of the classification hierarchy the most specific category that has non-zero goodness of fit score. For example, referring to the classification hierarchy of FIG. 8, if the category Buffalo Bills is assigned a goodness of fit score of 75%, the higher level categories in its branch will also have non-zero goodness of fit scores; however, Buffalo Bills is the most specific category having a non-zero score in its particular branch of the hierarchy. The metadata generator then determines additional representative categories by examining the differences in the goodness of fit scores of the most specific categories and their parent categories. In preferred embodiments, the parent category of a most specific category is determined to be an additional representative category if the difference between its score and the most specific category exceeds a predetermined amount or percentage. Determination of such parent categories serves to identify instances in which it is desirable to supplement or qualify the representative information conveyed by the score of a most specific category. It may also be preferable to limit the number of categories per programming event by defining a maximum number of categories per programming event and utilizing the categories with the highest scores consistent with that maximum number. It may further be preferable to utilize a score thresholding procedure whereby a minimum goodness of fit score is required for a category to be included in the metadata.

Once determined, the identifiers and associated goodness of fit scores of the representative categories are stored in delimited fashion (56). Other data is also generated through processing of the PDD and production data and is stored together with the goodness of fit scores in delimited fashion to comprise metadata for the programming event. The other data referred to here may comprise data such as is shown in the exemplary metadata of FIG. 7, such as description, time, duration, keywords, etc. Like categories, keywords may be assigned goodness of fit scores using a classification application. A variety of storage formats are available for storing the metadata. For example, the metadata may be stored as an XML document using appropriate tags for indicating the various types of data within the metadata.

In further preferred embodiments, the metadata generator may additionally provide automatic generation of keywords. Keywords are preferably generated through analysis of descriptive data included in any production data and PDD data that is available for the programming event. In one preferred embodiment, all text data associated with the programming event such as script data and PDD data is processed to identify all verbs and all nouns and associated adjectives contained therein. These candidate keywords are then provided as input to the categorization tool, which produces a goodness of fit score for each category of the classification hierarchy based on each input candidate keyword. Keywords are then chosen from among the candidate keywords based on the highest goodness of fit score associated with each candidate. To provide further precision, the category goodness of fit scores for each candidate keyword may be correlated with the category goodness of fit scores for the programming event as a whole, so that candidates having high goodness of fit scores for categories that are not relevant to the programming event as a whole are not chosen as keywords. The highest category goodness of fit score for each chosen keyword may be adopted as a goodness of fit score for the keyword itself.

In one alternative to the aforementioned preferred embodiment, processing of the descriptive data to determine nouns and verbs may be eliminated and all words from available script data may be provided as candidate keyword inputs to the classification tool. In this alternative embodiment it is preferred to correlate the resulting category scores of each candidate keyword with the category scores of the programming event as a whole.

Figure 10:
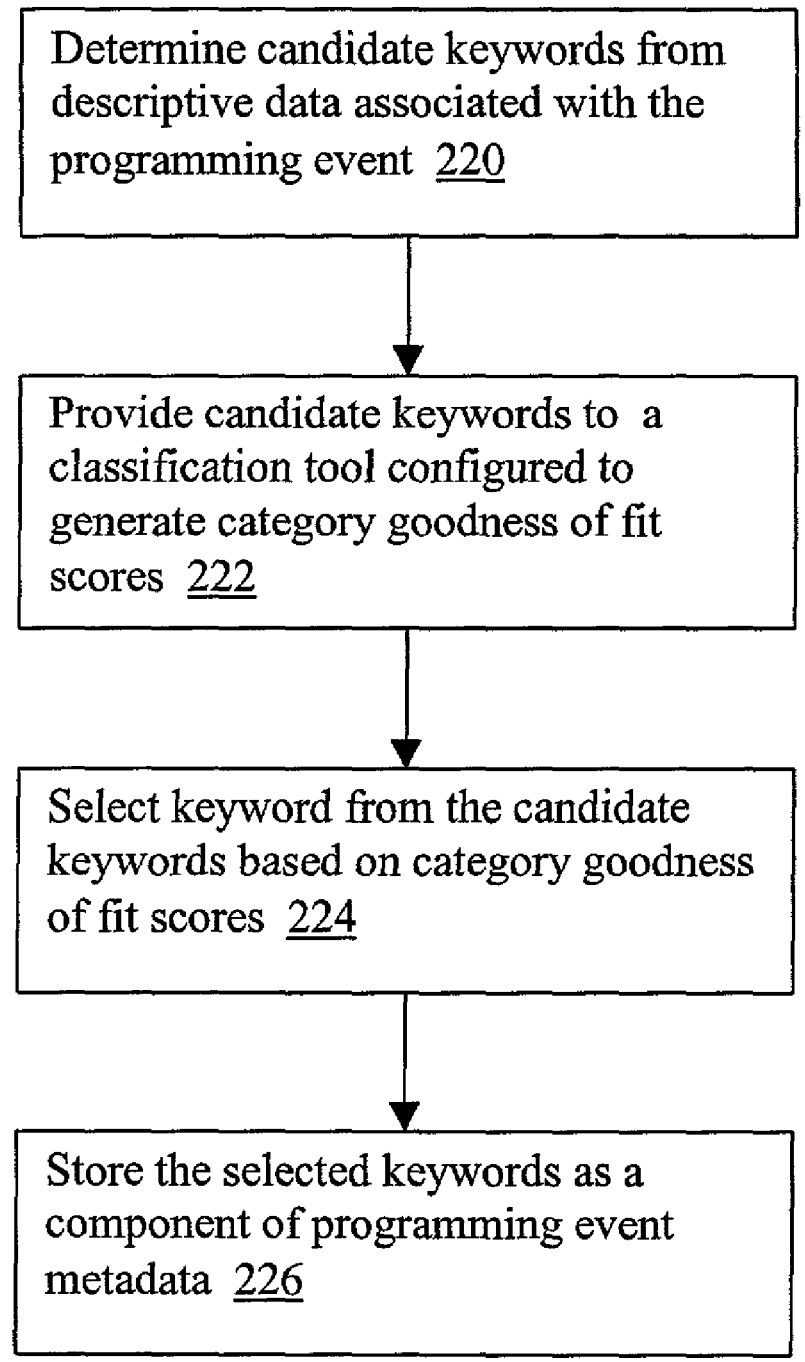
FIG. 10 illustrates a process for generating keyword metadata in accordance with an embodiment of the invention.

A process encompassing the aforementioned preferred embodiment, its suggested alternatives and other alternative implementations is illustrated in FIG. 10. As shown in FIG. 10, candidate keywords are determined (220) from descriptive data associated with a programming event. The candidate keywords are provided (222) as input to a classification tool configured to generate goodness of fit scores for categories of a classification hierarchy. Keywords are then selected (224) from among the candidate keywords based on the category goodness of fit scores generated for each of the candidate keywords by the classification tool. The selected keywords are then stored (226) as a component of metadata for the programming event.

In a further preferred embodiment, the metadata generator may additionally provide automatic generation of titles for programming events. This embodiment is particularly preferred for applications in which the programming event comprises a segment of a larger program, for example, an individual segment of a news program. In accordance with the preferred embodiment, the metadata generator generates a title for the programming event through analysis of the production data. For example, the title may comprise the name of the category having the highest goodness of fit score in the metadata, combined with one or more of the highest scoring keywords. Alternatively, the classification tool that generates category goodness of fit scores may be further configured to produce a summary of the programming event using the descriptive data. In further alternatives, a most descriptive noun, action word, or phrase may be selected from the descriptive data.

Figure 11:
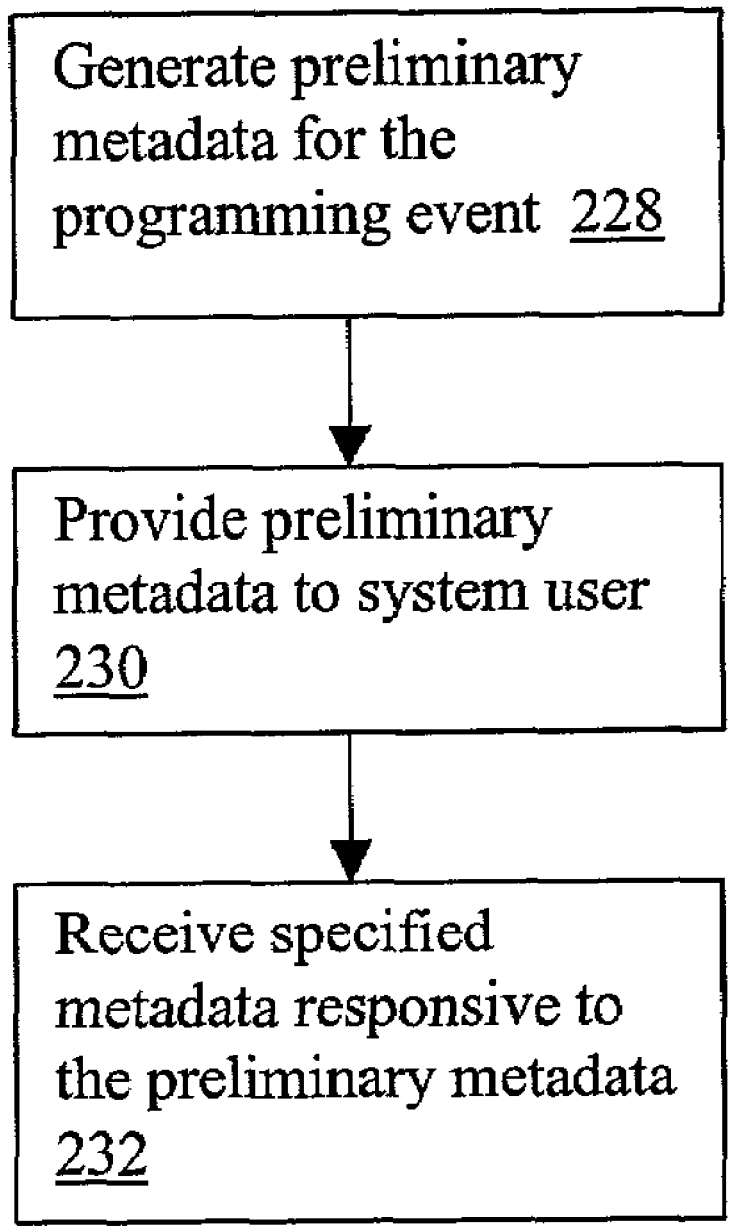
FIG. 11 illustrates an interactive process for generating metadata in accordance with an embodiment of the invention.

As an enhancement to the aforementioned embodiments, a further preferred embodiment may implement an interactive process whereby a producer of a programming event is enabled to select or specify categories, keywords, and goodness of fit scores to be included in the metadata for the programming event. FIG. 11 shows process flow in a system in accordance with this preferred embodiment. Initially the system generates (228) preliminary metadata for the programming event. The preliminary metadata is typically generated from production data and PDD data using a classification tool in the manner described herein, and typically comprises categories and category goodness of fit scores, keywords and keyword goodness of fit scores, and a title. The preliminary metadata is then provided (230) to a system user, typically a producer or other person involved with production of the programming event. The preliminary metadata is preferably provided using a graphical user interface that displays the various components of the preliminary metadata and enables the system user to change the preliminary metadata or to add additional metadata. For example, the system user is preferably enabled to delete a category, add a category, and add or change a category goodness of fit score. Similarly, the system user is preferably enabled to add or delete keywords, to change keyword goodness of fit scores, and to edit titles and other descriptive components of the preliminary metadata. Thus by operation of the user interface, the system receives (232) specified metadata from the system user responsive to the preliminary metadata. The specified metadata, or at least the portions of the metadata that were specified by the system user, are then utilized by the metadata generator in preference to any conflicting metadata that may be later generated by the classification application. In one alternative to these embodiments, the system user may simply approve the preliminary metadata provided by the system. This approval may be provided separately for the different metadata components such as categories, category goodness of fit scores, keywords, keyword goodness of fit scores, and title.

The aforementioned embodiments may be implemented in a variety of manners in accordance with the particular application. In one implementation, the user interface is generated by the production facility agent, while the preliminary metadata is generated by a remote metadata generator with which the production facility agent interacts. The production facility agent may be implemented independently of other applications running on the production facility equipment, or it may be implemented through macros or extensions associated with other production equipment applications. Alternatively, the metadata generator may be implemented locally as part of the production facility agent or as a separate agent running on the production facility equipment.

In further alternative embodiments it may be desirable for business purposes to adjust the goodness of fit scores for particular programming events before they are stored in metadata. For example, goodness of fit scores may be raised so that that analysis of the goodness of fit scores will be biased in favor of those programming events as compared to other programming events.

As described above with respect to FIGS. 1 and 5, metadata for programming events may be distributed to client devices, where it may then be processed by a client device to automatically determine programming events that are desirable for viewing or storage. The client device is preferably a video storage device that is used in association with a video display device such as a television for reception, display and storage of video. However, embodiments of the invention may be implemented in a variety of other types of client devices including set top boxes, personal computers, video display devices such as televisions, wireless communication devices, and personal digital assistants.

Figure 12:
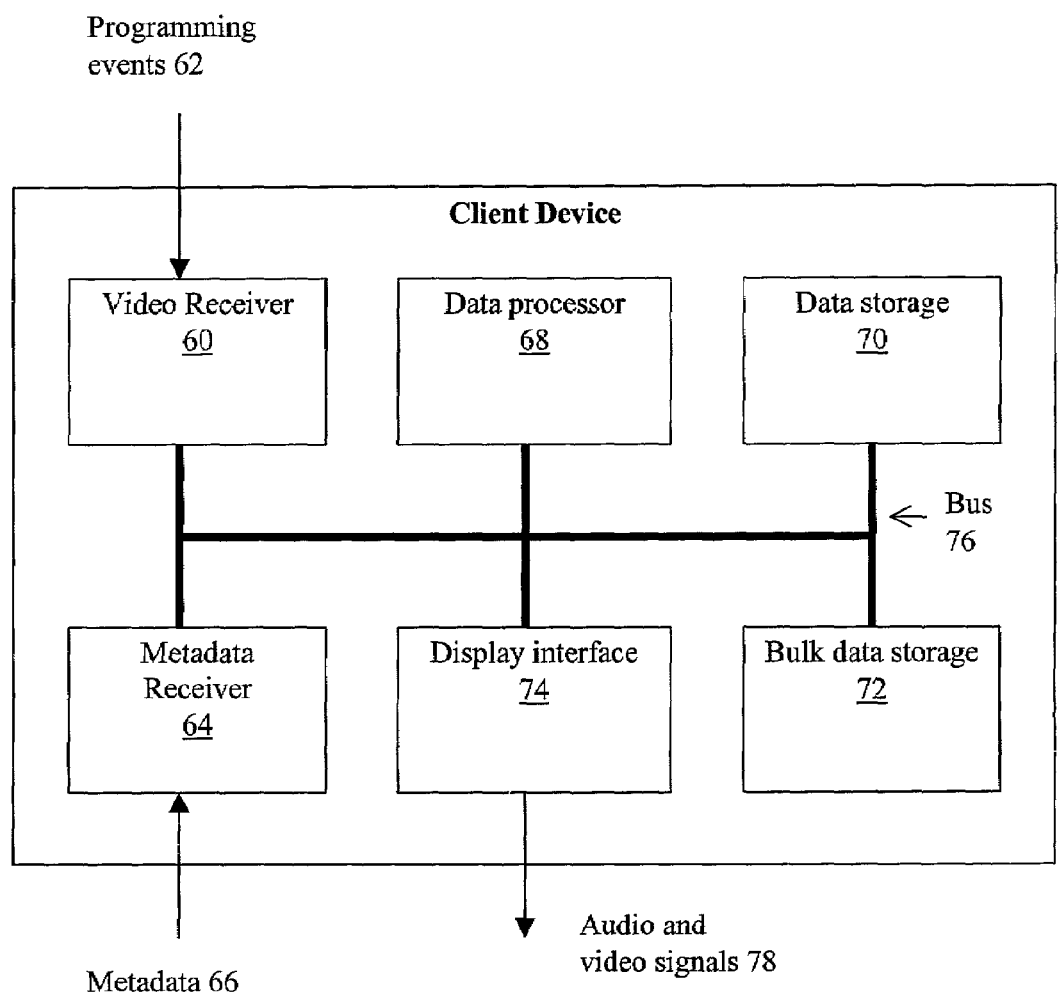
FIG. 12 illustrates a client device in accordance with an embodiment of the invention.

Client devices in accordance with embodiments of the invention are comprised of a data processing device that includes a processor or processors and memory storing one or more viewer profiles, received metadata, and programming instructions that instantiate a client agent that processes metadata to determine programming events that are desirable for viewing or storage in accordance with the viewer profiles. FIG. 12 shows a client device in accordance with a preferred embodiment of the invention. In this preferred embodiment, the client device receives video signals from a broadcast, cable or satellite television provider, data network, or other video source, and receives metadata from a distinct metadata distributor such as an internet server. The client device includes a video receiver 60 for receiving and demodulating signals representing programming events 62. Typically the video receiver is a device for demodulating analog or digital video signals. The client device further includes a metadata receiver 64 for receiving metadata 66. Typically the metadata receiver is a device that is capable of communicating with a network for downloading metadata files to the client device. For example, the metadata receiver may be a modem that is programmed to periodically access a remote server where metadata is stored. The client device further comprises a data processor 68 such as a microprocessor, a data storage device 70 such as a RAM or ROM or a combination of the two, and a bulk data storage device 72 such as hard disk storage or optical disk storage. A display interface 74 generates audio and video signals 78 for use by a display device such as a television. The video receiver 60, metadata receiver 64, data processor 68, data storage 70, bulk data storage 72, and display interface 74 are coupled through a bus 76.

As noted above, it is assumed for the preferred embodiment shown in FIG. 12 that the client device receives video signals from a broadcast, cable or satellite television provider, or data network and receives metadata from a distinct metadata distributor such as a dial-up server, and therefore has separate video and metadata receivers. However, in alternative embodiments, both the metadata and programming events may be received by a single receiver. For example, metadata may be transmitted in broadcast provided through broadcast or cable television channels, or may be provided in a text band of a digital video signal such as is provided in the MPEG-2 digital video standard. Alternatively, video and metadata may be provided from a common source through a common transmission medium, but received by separate receivers in the client device, as is the case in preferred cable television receiver embodiments.

Client devices in accordance with preferred embodiments of the invention provide standard PDD information and standard tools such as a program grid and keyword searching to allow users to manually identify programs for viewing or recording. In addition, client devices in accordance with preferred embodiments of the invention analyze metadata to determine desirable upcoming programming events, and may automatically record these programming events, alert the viewer to these programming events, or automatically display these programming events. The desirability of a programming event is determined with respect to viewer preferences represented in one or more viewer profiles stored in the client device. An example of a viewer profile in accordance with preferred embodiments of the invention is provided in FIG. 13. In this viewer profile, a Profile_ID field provides a unique identifier for the profile. A Profile_Name field provides a name for the profile as it will be known to viewers. A Profile_Description field provides a longer description that may be used to provide more detail about the types of programs that the profile is intended to identify. A Profile_Priority field provides a number that indicates the priority of the profile relative to other profiles stored in the client device. A Profile_Alerts_Per_Hour field provides a number of times per hour that an alert is provided to the viewer indicating that a program providing a better fit than the one being viewed is currently available for viewing. A Profile_Alert_Minutes_In_Advance field specifies an amount of time prior to a programming event that a viewer is to be notified of a programming event. A Profile_Activation_Time indicates a time frame during which the profile should be used for analyzing programs. A Category_Scores field contains an identifier and associated preference score for categories in a classification hierarchy for which a preference score has been specified. The preference scores represent a relative degree of interest in each category that may be used in processing of metadata to determine the relative desirability of programming events using their category goodness of fit scores. In the preferred embodiment, a preference score of ten indicates the highest level of preference. A Keyword_List field contains keywords that reflect the viewer's viewing tastes. A keyword may be associated with a category of the classification hierarchy, indicating that the keyword reflects the viewer's viewing tastes specifically with regard to subject matter falling within that category. For example, in FIG. 13, the keyword "Bills" is associated with the category Sports/Football/NFL. Such keywords are referred to herein as qualified keywords. Qualified keywords allow the viewer to effectively define a subset of subject matter within a category that is of particular interest. Keywords may also be assigned preference scores, as shown in FIG. 12. As with categories, keyword preference score may be used in processing of metadata to determine the relative desirability of programming events using keyword matching. A variety of storage formats are available for storing the viewer profile. For example, the viewer profile may be stored as an XML document using appropriate tags for indicating the various types of data within the viewer profile.

The client device is preferably provided with generic viewer profiles that are tailored to different viewing interests such as sports, political news, and other interests. The generic profiles may be pre-programmed in the client device or may be provided to the client device by the metadata distributor. The user is preferably enabled to modify or delete the pre-programmed viewer profiles and to configure additional viewer profiles in accordance with particular viewing tastes.

Accordingly, the client device is provided with programming instructions for providing an editor enabling the user to create and edit viewer profiles. The profile editor provides a graphical user interface that includes tools enabling a user to enter the types of information that may be included in a viewer profile such as the one illustrated in FIG. 13. In particular, the viewer may enter information such as the profile name, description and priority, alerts per hour or other period of time, alert minutes in advance or time in advance, profile activation time, and keywords. In addition, the viewer may enter scores for each category in the classification hierarchy, may associate keywords with categories of the classification hierarchy as qualified keywords, and may associate preference scores with keywords and qualified keywords. The user interface preferably allows the user to navigate through the classification hierarchy structure and to enter scores for categories as desired. When a preference score is entered for a given category, that preference score is preferably assigned to all subcategories of the given category. In other words, all categories that branch from the given category are assigned the same preference score as the given category. Therefore, if a category is given a preference score of ten, all of its subcategories will likewise be given a preference score of ten. Similarly, if a category is given a preference score of zero, all of its subcategories are likewise given a score of zero. Of course, the scores for those subcategories can later be changed individually.

Figure 14:
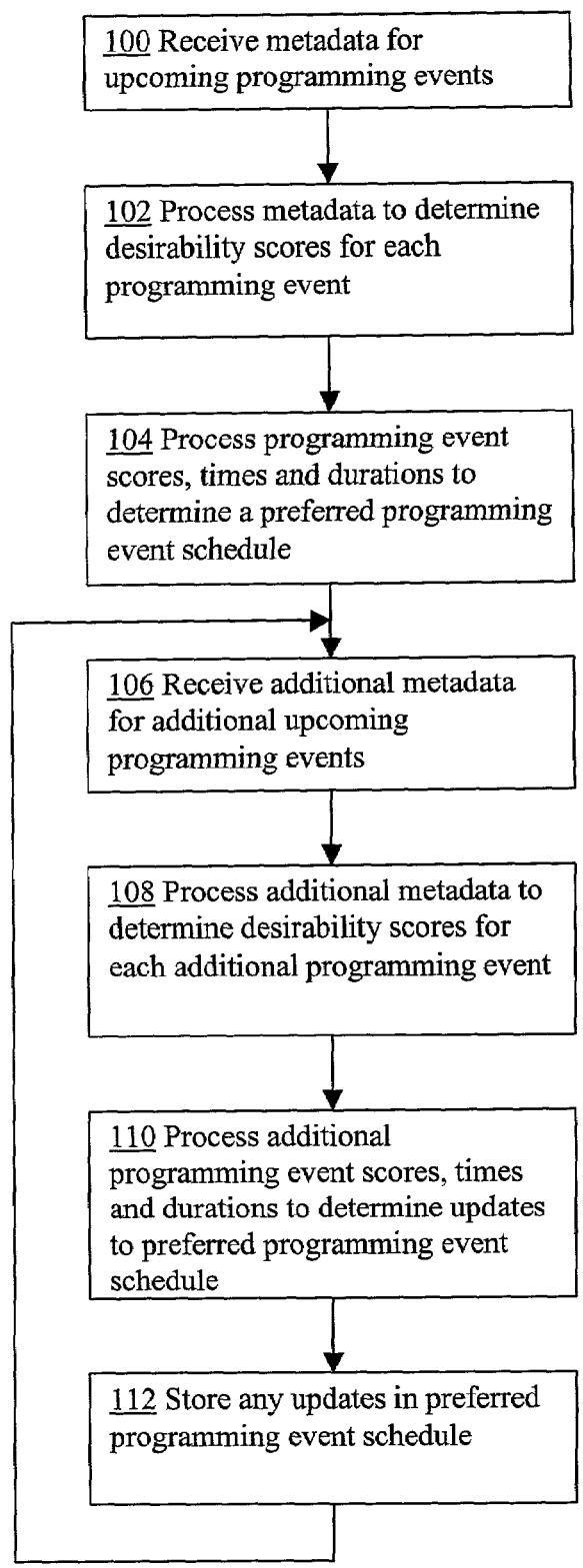
FIG. 14 illustrates a process for producing a preferred programming event schedule in accordance with an embodiment of the invention.

Viewer profiles may be used in processing metadata to build a schedule of desirable programming events that may be automatically recorded, recommended for viewing, or switched to automatically. A schedule building process in a client device in accordance with preferred embodiments is illustrated in FIG. 14. This process assumes that metadata for various programming events becomes available sporadically, and the process therefore involves periodic updating to account for any newly available metadata. Initially, all available metadata for upcoming programming events is received (100). The metadata may be received by connecting to a server and downloading new metadata. Alternatively, metadata may be continuously received through the broadcast system that provides programming events. The metadata is then processed in accordance with one or more viewer profiles to assign desirability scores to each programming event (102). The scores of the programming events along with their times and durations are then processed to determine a preferred programming event schedule (104). In the case of a recording schedule in a device capable of recording only one programming event at a time schedule reflects the most desirable non-overlapping available programming events. In contrast, in the case of an alert schedule, the programming events may overlap, since the viewer can decide which programming events to watch. In each instance, the client device preferably stores at least the programming event title, time, duration, and category, and the viewer profile or profiles that resulted in its selection. Generation of the schedule may include a thresholding function whereby a programming event must achieve a minimum desirability score in order to be included in the schedule. Other functions, such as filtering out programming events that have already been recorded or viewed, may also be performed. After the schedule is determined, a periodic updating of the schedule is performed. Particularly, after a given time interval, additional metadata is received (106). The additional metadata typically corresponds to programming events for which no metadata was previously received, but updated metadata may also be received. The additional metadata is processed to determine desirability scores for corresponding programming events (108). The scores, times and durations for those programming events are then processed to determine any updates to the preferred programming event schedule (110). An alert list may be updated whenever a new programming event score is determined to be higher than one already stored in the schedule. A recording schedule may be updated when a new programming event score is determined to be higher than another programming event in the same time slot that is already stored in the schedule, or when a new programming event with a sufficiently high score occurs in a time slot for which there is no programming event listed in the schedule. After determining any updates, the updates are stored in the preferred programming event schedule (112). The updating process is then repeated at intervals.

Since metadata is assumed to arrive sporadically and may arrive only shortly prior to the time of its corresponding programming event, it is preferable to prioritize the processing of available metadata on the basis of the time remaining until the beginning of the corresponding programming event. This may be determined through reference to time data contained within the metadata.

In conjunction with the scheduling process, the viewer is preferably notified each time a programming event is added to the schedule, and enabled to approve or decline each programming event. This may be accomplished by displaying an icon that may be operated by the viewer to display information about a newly scheduled programming event. Scheduled programming events that have been explicitly approved by the viewer may be treated in the updating process as having a highest possible desirability score, irrespective of the actual score, such that conflicting programming events that have higher scores but were not identified prior to the viewer's approval cannot be substituted in the schedule without explicit viewer approval. In further preferred embodiments of the invention, the user is enabled to manually edit the preferred programming event schedule and to manually schedule programming events for recording. Like viewer-approved programming events, manually scheduled programming events are given priority over later-identified preferred programming events.

Figure 15:
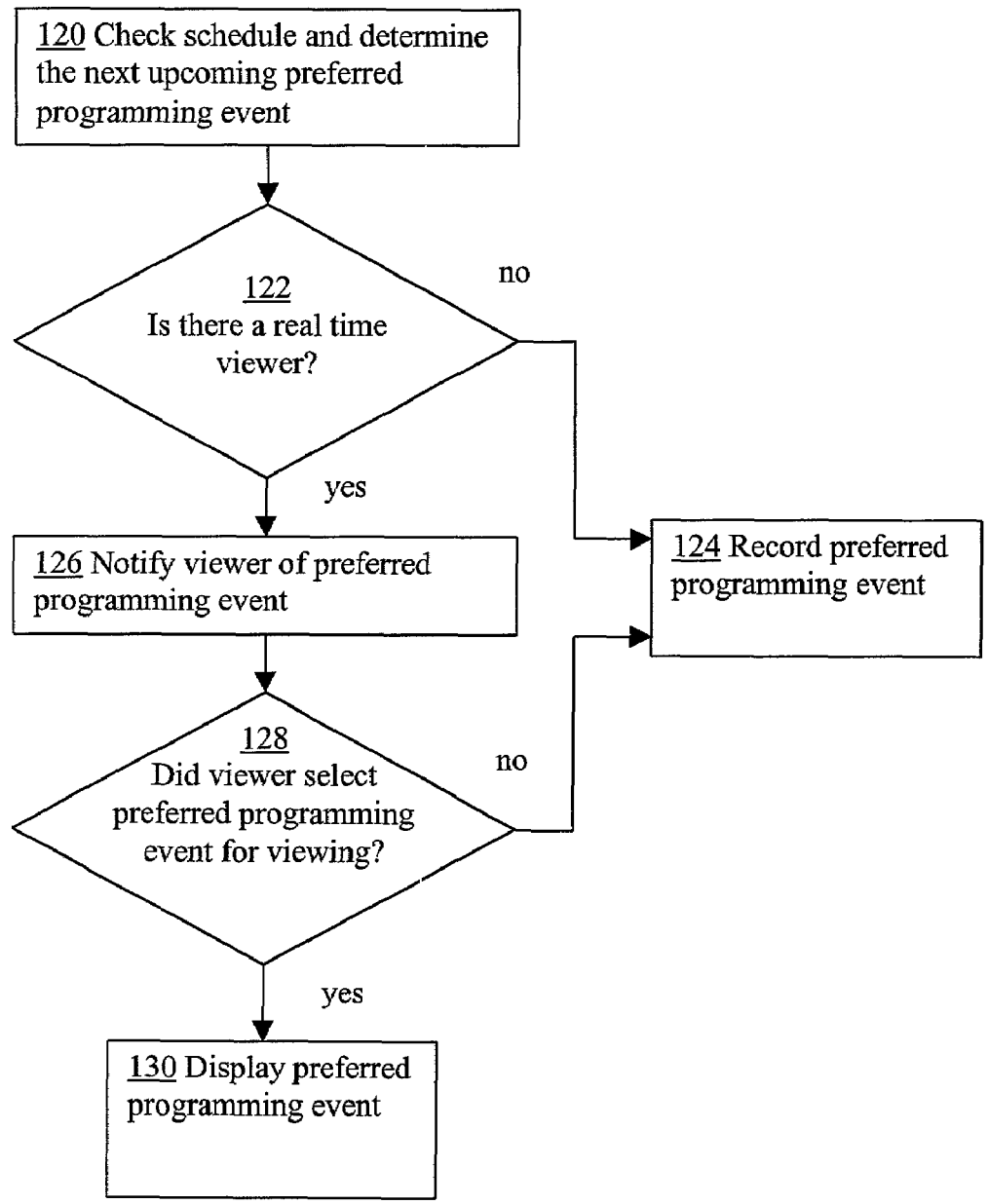
FIG. 15 illustrates a process for selectively notifying a viewer of a programming event and recording a programming event in accordance with an embodiment of the invention.

In preferred embodiments of the invention, the preferred programming event schedule may be used by the client agent to provide alerts concerning programming events to a real time viewer, or to automatically record programming events when no real time viewer is present. A control process performed by the client agent in accordance with preferred embodiments of the invention is shown in FIG. 15. In the illustrated process, it is assumed that the client device includes two RF tuners enabling a real time viewer to receive a first channel for viewing while a second channel may also be received for recording. Initially, the client agent checks the schedule to determine a next upcoming preferred programming event (120). The client agent then determines whether a real time viewer is present (122). If no viewer is present, the preferred programming event is recorded (124), for example, by storage in the bulk data storage device as illustrated in FIG. 12. Alternatively, if there is a real time viewer, the viewer is provided with an alert for the upcoming preferred programming event (126). Alerts may be provided in various manners, such as by generating an audible tone or displaying a banner on the video display device. The time of the notification may be determined with reference to the value in the Profile_Alert_Minutes_In_Advance field of a viewer profile as shown in FIG. 13. If the viewer selects the preferred programming event for viewing (128), the preferred programming event is automatically displayed as soon as it is available for viewing (130). On the other hand, if the viewer does not select the preferred programming event for viewing, the preferred programming event is recorded (124). In alternative embodiments where the client device includes only one RF tuner, the decision by a real time viewer not to view something other than the preferred programming event causes the recording of the preferred programming event to abort. Newly recorded programs are preferably identified in a notification list that may be accessed by the viewer. The notification list may be cleared after each access by the viewer.

Recorded programming events are preferably indicated in a recorded program list from which the user is enabled to select recorded programming events for viewing. Information stored in association with each programming event in the recorded program list preferably includes the time and date of the programming event, the programming event score, the profile that selected the programming event for recording, and the category of the programming event. A user is preferably enabled to sort the recorded program list in accordance with any of these categories of information. The device also preferably provides the option of seamless replay of the recorded programming events in an order chosen in accordance with one of the above categories of information.

In one preferred embodiment of the invention, the client device comprises a set top box such as a cable box. The set top box analyzes metadata and generates a schedule of programming events that match viewer preferences. The set top box further provides on-screen alerts in advance of each programming event in the schedule. The on-screen alert is preferably available in multiple styles that may be chosen by the user, such as an icon or an information banner. The banner may contain information such as the programming event title, a description, an indication of categories or keywords matched, and the channel number or identifier. A particular category matched, or the fact of a keyword match, may be indicated by an icon displayed within the alert banner. In one preferred embodiment, the banner includes the matched category generating the highest match score, the matched keyword generating the highest match score, and the associated scores. The banner is also preferably provided in different colors that correspond to the viewer profile that generated the alert. The user is preferably enabled to configure the default amount of time that the alert is displayed, to clear the alert from the screen, and to switch to the programming event of the alert automatically. The user is also preferably enabled to view the alert list and to delete programming events from the alert list.

The alert list is preferably viewable by the viewer, and preferably allows the viewer to delete programming events from the alert list, and to confirm interest in programming events in the alert list so that subsequently analyzed programming events with higher scores do not cause those programming events to be bumped from the list. The alert list is preferably generated in a manner that provides a maximum number of alerts within a given time period, such as a fixed number of alerts per hour. This parameter may be configured as part of a viewer profile, as shown in FIG. 13. The alert list preferably highlights any programming events in the list that are currently showing. The alert list is preferably limited to those channels that the client device is capable of receiving.

As noted above, the client device may determine preferred programming events with respect to one or more viewer profiles. In the case where alerts are provided, it is preferable that the viewer profiles used by the client device to identify programming events correspond to the preferences of the actual real time viewers. Accordingly, the client device may enable a real-time viewer to specify one or more viewer profiles to be used for generating alerts during the viewer's viewing session. For example, the viewer may select a particular viewing profile tailored to his tastes while excluding profiles of other viewers who are not present, or the viewer may select a group viewer profile that reflects the collective tastes of present viewers. In alternative embodiments, upon detection of a real time viewer, such as by detecting activation of the video display device or changing of channels, such profiles may be automatically selected by the client device based on indicators of the current real time viewer such as channel selection patterns. In view of these considerations, embodiments that provide both real time viewer alerts and automatic recording may preferably maintain a first preferred programming schedule for recording purposes based on the full set of viewer profiles maintained by the client device, and may further generate a second preferred programming schedule in accordance with profiles specific to the real time viewer as described above for purposes of providing alerts. In such embodiments, conflicts between the two programming schedules are resolved in favor of the real time viewer where only a single receiver is available.

The task of determining desirability scores for programming events is performed using the metadata for a programming event and one or more viewer profiles stored in the client device. In preferred embodiments of the invention, scores are determined in a manner that gives preference to keyword matches over category matches. Thus, for example, where a viewer's keyword matches a keyword contained in the keyword field of the metadata, or matches a word contained in the description field of the metadata, that programming event may be assigned the maximum preference score irrespective of any preference score generated using the programming event's category goodness of fit scores. Further scoring methods using a combination of keyword and category matching are described below.

Figure 16:
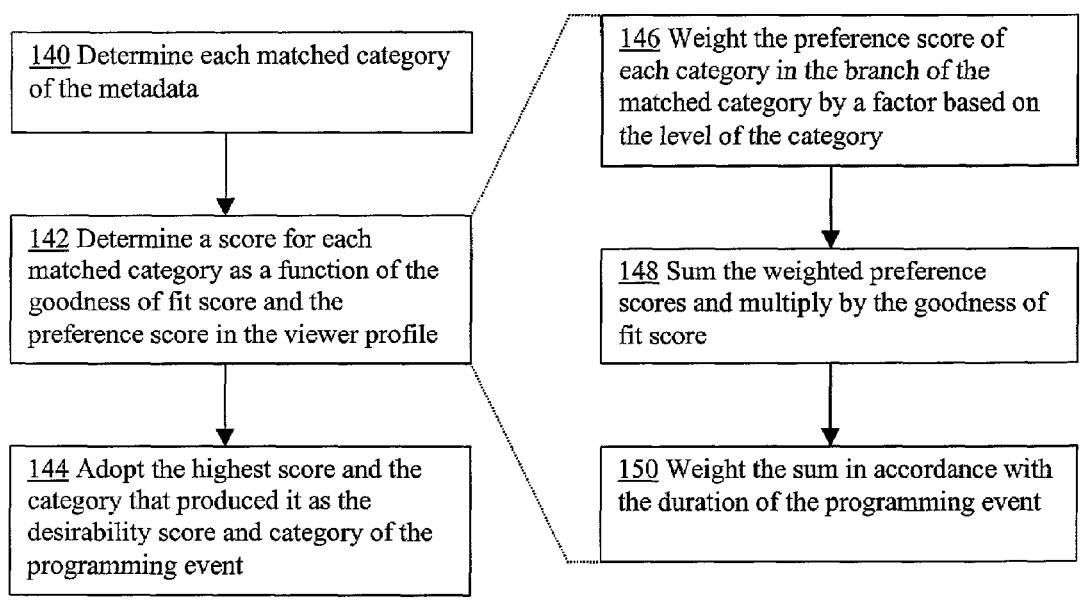
FIG. 16 illustrates a process for assigning a desirability score to a programming event based on category matching using a viewer profile in accordance with a preferred embodiment of the invention.

A process for determining a desirability score for a programming event based on metadata category goodness of fit scores and viewer profile category preference scores in accordance with a preferred embodiment of the invention is shown in FIG. 16. Referring to the left-hand column of FIG. 16, the process first determines each category of the classification hierarchy that has a goodness of fit score in the metadata and that is assigned a preference score in the viewer profile (140). These categories are referred to herein as matched categories. For purposes of this determination, a category having a preference score that is equal to zero or less than a threshold minimum score may be treated as not having a preference score, and thus the category will not be considered a matched category. For each matched category, a score is determined (142). The score is a function of the goodness of fit score of the matched category and the preference score of the matched category. The score may be weighted in accordance with the specificity of the matched category so that the score increases with the specificity of the matched category. After scores for each matched category are determined, the highest score and the category generating the highest score are adopted as the desirability score and category of the programming event (144).

The function and weighting scheme for generating scores may be implemented in a variety of manner. For example, in an implementation in which the categories of the classification hierarchy are assigned individual specificity weights that increase with the specificity of the category, the score may be calculated as a function of the goodness of fit score, the preference score, and the specificity weight of the matched category. In this manner, the score is influenced by the preference encoded by the viewer in the profile for the matched category, the degree to which the programming event is described by the matched category, and the specificity with which the matched category describes the subject matter of the programming event.

Figure 17:
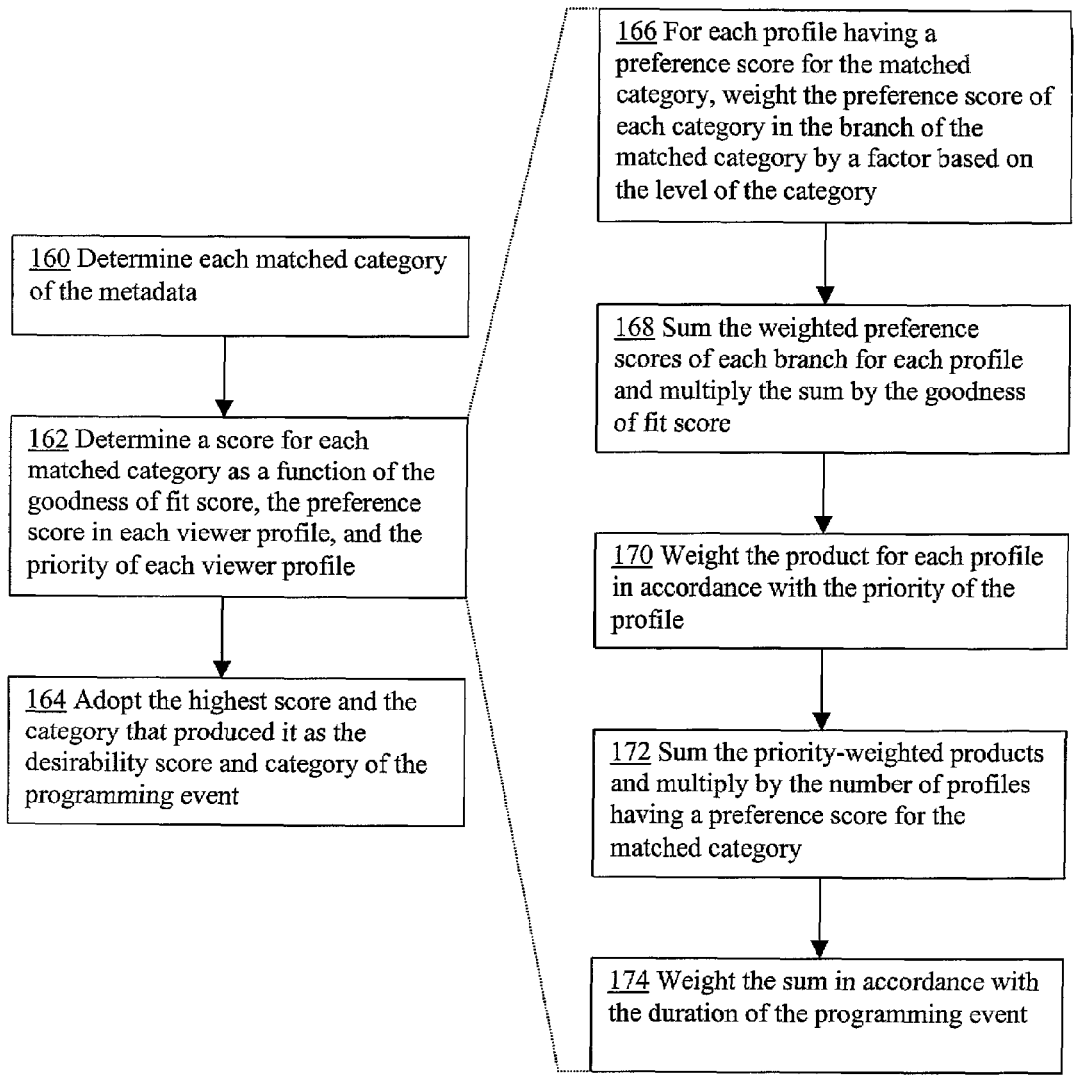
FIG. 17 illustrates a process for assigning a desirability score to a programming event based on category matching using multiple viewer profiles in accordance with a preferred embodiment of the invention.

In accordance with a preferred embodiment of the invention, a score is calculated as illustrated in the right-hand column of FIG. 16. In this preferred embodiment, the categories of the classification hierarchy are arranged in common ordinal levels, and the level of a category is taken as being representative of its specificity. Thus, in accordance with the preferred embodiment of FIG. 16, the score for a given matched category is calculated by first weighting the preference score of each category in the branch terminating with the matched category by a factor that is based on the level of the category (146). In the preferred embodiment, this weight is calculated as the quantity $e^{N-i}$, where N is the number of ordinal levels in the classification hierarchy and i is the ordinal level of that particular category. The weighted preference scores for all of the categories in the branch are then summed, and the sum is multiplied by the goodness of fit score of the matched category (148). This sum is then weighted in accordance with the duration of the programming event (150), for example, by multiplying the score by 10,000 and adding the duration in seconds of the programming event. Weighting of the score by the program duration serves to resolve conflicts among overlapping programming events that would otherwise have identical scores. The score for each matched category is therefore calculated as:

$$\left(10^4 * S * \sum_{i=1}^{N} P(V_i) * e^{N-i}\right) + d$$

where:
N=the number of ordinal levels in the classification hierarchy
$V_i$=a category in the branch of the matched category at level i of the hierarchy
$P(V_i)$=the preference score of category $V_i$ in the viewer profile
S=the goodness of fit score of the matched category
d=the duration of the programming event in seconds In further preferred embodiments, the category preference scores of multiple viewer profiles may be used for determining desirability scores for programming events. A process for determining a desirability score for programming events in accordance with a preferred embodiment is shown in FIG. 17. This embodiment is particularly preferred for generating scores to be used in determining a recording schedule that accounts for the combined preferences expressed in more than one viewer profile. Referring to the left-hand column of FIG. 17, the process first determines each category that has a goodness of fit score in the metadata and that is assigned a preference score in a viewer profile (160). These again are referred to as matched categories, and may omit any categories having a preference score less than a certain minimum value. For each matched category, a score is determined (162). The score is a function of the goodness of fit score of the matched category, the preference score assigned to the matched category in each viewer profile, and a priority of each viewer profile. The score may be weighted in accordance with the specificity of the matched category so that the score increases with the specificity of the matched category. After scores for each matched category are determined, the highest score and the category generating the highest score are adopted as the desirability score and category of the programming event (164).

The function and weighting scheme for generating scores may be implemented in a variety of manner. For example, in an implementation in which the categories of the classification hierarchy are assigned individual specificity weights that increase with the specificity of the category, the score may be calculated as the sum of quantities calculated for each profile, where that quantity is the product of the goodness of fit score, the preference score, a quantity proportional to the priority of the viewer profile, and the specificity weight of the matched category. In this manner, the score is influenced by the preference encoded by the viewer in each profile for the matched category, the degree to which the programming event is described by the matched category, the priority of each profile that included a score for the matched category, and the specificity with which the matched category describes the subject matter of the programming event.

In accordance with a preferred embodiment of the invention, the score is calculated as illustrated in the right-hand column of FIG. 17. In this preferred embodiment, the categories of the classification hierarchy are arranged in common ordinal levels, and the level of a category is taken as being representative of its specificity. Thus, in accordance with the preferred embodiment of FIG. 17, the score for a given matched category is calculated by first weighting the preference score of each category in the branch terminating with the matched category by a factor that is based on the level of the category (166). This is done for each profile that includes a preference score for the matched category. In the preferred embodiment, this weight is calculated as the quantity $e^{N-i}$, where N is the number of ordinal levels in the classification hierarchy and i is the ordinal level of that particular category. The weighted preference scores for all of the categories in each branch are then summed for each profile, and these sums are multiplied by the goodness of fit score of the matched category (168). Each of these products is then weighted in accordance with the priority of its profile. In the preferred embodiment, a quantity P is associated with each priority, such that P is greater for higher priority. The weight for a given profile j may then be calculated as the quantity $P_j$ divided by the sum of all Ps corresponding to all profiles having a preference score for the matched category. After priority weighting the product for each profile (170), the priority weighted products are summed together and multiplied by the number of profiles that include a preference score for the matched category (172). This sum is then weighted in accordance with the duration of the programming event (174), for example, by multiplying the score by 10,000 and adding the duration in seconds of the programming event. The score for each matched category is therefore calculated as:

$$\frac{10^4 * S * |I| * \sum_{j=1}^{|I|} P_j \left(\sum_{i=1}^{n} P(V_{ij}) * e^{N-i}\right)}{\sum_{j=1}^{|I|} P_j} + d$$

where:
N=the number of ordinal levels in the classification hierarchy
$V_i$=a category in the branch of the matched category at level i of the hierarchy
$P(V_{ij})$=the preference score of category $V_i$ in profile j
P(j)=a quantity representing the priority of Profile j
|I|=number of profiles that include a preference score for the matched category
S=the goodness of fit score of the matched category
d=the duration of the programming event in seconds In contrast to the aforementioned multiple viewer profile embodiment, it is sometime preferable to calculate scores for viewer profiles individually rather than in a combined manner as discussed above. For example, for providing alert lists for multiple viewer profiles, it is desirable to normalize the number of alerts generated by each profile. Thus in such embodiments it is preferred to calculate the scores for each profile separately and allot a given number of alerts to each profile.

In alternative preferred embodiments, desirability scores may be determined through a combination of keyword and category matching to produce results that satisfy the viewer's preferences with greater reliability. For purposes of describing these alternative embodiments, desirability scores determined based upon category matching as described above will be referred to as category match scores, while desirability scores based upon keyword matching will be referred to as keyword match scores or qualified keyword match scores, as discussed further below.

In a first alternative preferred embodiment, simple keyword matching may be employed in combination with category matching to rank programming events. In this alternative embodiment, a simple keyword match between a keyword of a viewer profile and a metadata keyword or a word included in descriptive data of the metadata produces a keyword match score. A keyword match preferably encompasses both exact matches between keywords and matches between roots of keywords. The keyword match score assigned to a simple keyword match is preferably chosen to be greater than a maximum category match score, so that any programming event having a keyword match is ranked higher than any programming event not having a keyword match. This reflects a presumption that a programming event matching a keyword provided by a viewer is more likely to satisfy the viewer's preferences than a programming event matching the viewer's specified categories. Of course, alternatives to the present embodiment may implement different scoring reflecting different presumptions.

The keyword match score may be a constant that is assigned for each keyword match. Alternatively, the keyword match score may be a constant that is augmented by an additional quantity that is programming event dependent to thereby minimize the possibility of equal ranking resulting from more than one keyword match. For example, a constant used as a basic keyword match score may be augmented by a quantity that is derived from the length of the programming event, or a preference score associated with the keyword in the viewer profile that produced the keyword match, or a category match score determined for the programming event using the category preference scores of the viewer profile that produced the keyword match.

Figure 18:
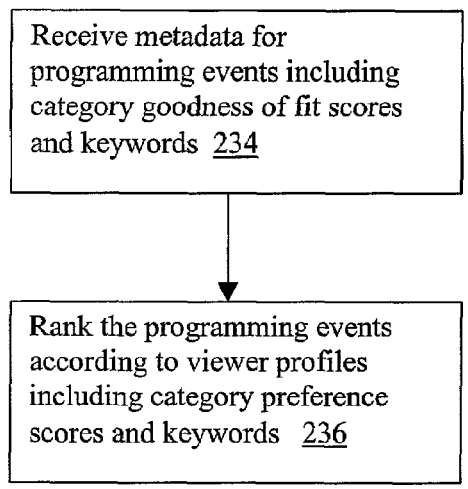
FIG. 18 shows a process for ranking programming events based on category matching and keyword matching in accordance with a preferred embodiment of the invention.

A basic process in a client device encompassing the first alternative preferred embodiment and various implementations thereof is illustrated in FIG. 18. Initially metadata is received (234). The metadata describes programming events, and includes goodness of fit scores associated with categories of a classification hierarchy. The metadata further includes at least one of descriptive data, such as is illustrated in the Program_Description and Program_Reduced_Description fields of the metadata of FIG. 7, and keyword data, as illustrated in the Keyword_List field of FIG. 7. After receiving metadata, the programming events are ranked (236) in accordance with viewer preferences expressed in one or more viewer profiles. The viewer profiles include preference scores associated with categories of the classification hierarchy and one or more keywords. The ranking uses the metadata goodness of fit scores and the viewer profile category preference scores to determine category matches and uses the metadata descriptive data and/or keyword data and the viewer profile keywords to determine keyword matches.

In a second alternative preferred embodiment, qualified keyword matching may be employed in combination with simple keyword matching and category matching to rank programming events. In this alternative embodiment, a match between a qualified keyword of a viewer profile a metadata keyword or a word included in descriptive data of the metadata produces a qualified keyword match score when the metadata includes a goodness of fit score for the category specified in the viewer profile for the qualified keyword. A qualified keyword match preferably encompasses both exact matches between keywords and matches between roots of keywords. The keyword match score assigned to a qualified keyword match is preferably greater than a greatest possible simple keyword match score, so that any programming event having a qualified keyword match is ranked higher than any programming event having only a simple keyword and/or category match. This reflects a presumption that a programming event matching a qualified keyword provided by a viewer is more likely to satisfy the viewer's preferences than a programming event matching a simple keyword or the viewer's specified categories. Of course, alternatives to the present embodiment may implement different scoring reflecting different presumptions.

The qualified keyword match score is preferably determined using a constant that is assigned to each qualified keyword match and that is augmented in each case by quantity that is determined using the preference score associated with the category of the qualified keyword in the viewer profile of the qualified keyword. In this manner the qualified keyword matches are ranked relative to one another based on the preferences for their associated categories expressed by the viewer. Alternative manners of ranking qualified keyword matches may also be employed, for example, using a preference score associated with the qualified keyword in the viewer profile that produces the qualified keyword match, or the length of the programming event, or a category match score determined for the programming event using the category preference scores of the viewer profile that produces the qualified keyword match, or the goodness of fit score of the qualified keyword's category in the programming event metadata.

Figure 19:
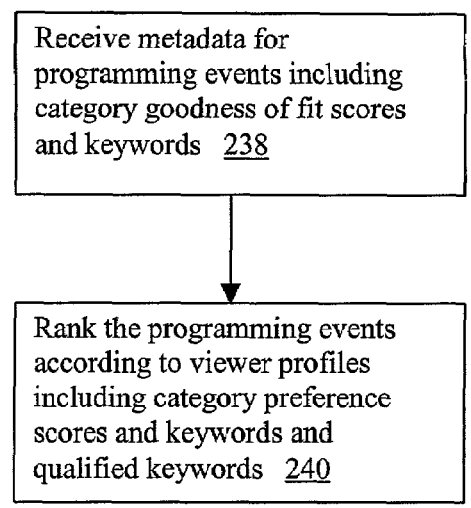
FIG. 19 shows a process for ranking programming events based on category matching, keyword matching and qualified keyword matching in accordance with a preferred embodiment of the invention.

A basic process in a client device encompassing the second alternative preferred embodiment and various implementations thereof is illustrated in FIG. 19. Initially metadata is received (238). The metadata describes programming events, and includes goodness of fit scores associated with categories of a classification hierarchy. The metadata further includes at least one of descriptive data, such as is illustrated in the Program_Description and Program_Reduced_Description fields of the metadata of FIG. 7, and keyword data, as illustrated in the Keyword_List field of FIG. 7. After receiving metadata, the programming events are ranked (240) in accordance with viewer preferences expressed in one or more viewer profiles. The viewer profiles include preference scores associated with categories of the classification hierarchy and one or more keywords. The keywords may be qualified keywords or simple keywords. The ranking uses the metadata goodness of fit scores and the viewer profile category preference scores to determine category matches and uses the metadata descriptive data and/or keyword data and the viewer profile keywords and qualified keywords to determine keyword matches.

In further alternative embodiments, the matching processing in the client device may process qualified and simple keywords in a unified manner by treating unqualified keywords as qualified keywords that are associated with a super category of the classification hierarchy that encompasses all other categories.

It is noted that in embodiments such as the various alternative preferred embodiments described above, in which ranking is based on scores generated using two or more different types of matches, it is possible for a viewer profile to generate more than one match score for a programming event. For example, a viewer profile may generate both a keyword match and a category match for the programming event. In such embodiments, it is preferred to use the highest score for purposes of ranking. Alternatively, in further embodiments a single function of category, keyword and qualified keyword matches may be employed to generate a single score for each programming event.

In addition, it is preferable in the aforementioned preferred embodiments to apply thresholding processes that exclude keywords or categories from match processing where preference scores or goodness of fit scores are below a threshold value. For example, where the category of a qualified keyword has a goodness of fit score below a threshold for a given programming event, the qualified keyword may be excluded from analysis of that programming event.

The aforementioned systems and methods may be employed to provide a client device that generates a preferred programming event list and uses that list to provide alerts or to record programming events. In one embodiment of such systems, the timing of the alerts or recording may be determined with reference to time maintained by a client local clock using timing information contained in programming event metadata, such as a beginning time and duration, to determine the actual start time of the programming event. Client local clocks may be synchronized to a globally available timing reference such as the time signal provided by the Public Broadcasting System.

However, it may often be the case that timing information contained in programming event metadata does not represent the actual local clock time at which a programming event will begin. This may occur for a variety of reasons. For example, different programming event providers such as television broadcasters may not be synchronized to the same global timing reference. Thus, for example, the beginning of the noon hour broadcast on one network may begin earlier or later than that of another network by as much as a minute or more, and therefore the client local clock may be synchronized to only one, or possibly to neither of the programming event providers. As a result, a recording that is commenced based on the local clock time may not fully capture the desired programming event or may capture unwanted matter. Also, in multi-segmented programs such as news broadcasts, the predicted times and durations expressed in the metadata for each segment may not be adhered to during the actual broadcast, since the nature of such programs can be fluid with some segments running shorter or longer than predicted. Similarly, some programming events such as sporting events may exceed their scheduled time, causing subsequent events to be delayed.

Accordingly, it is desirable to provide timing references in the signals of the individual programming event providers that may be used by client devices to accurately determine the beginning and ending points of individual programming events. In accordance with one preferred embodiment, the closed caption data stream is used to convey programming event timing information to client devices. The EIA608B standard for analog closed caption data and the EIA708B standard for digital closed caption data include protocols for "hidden" data that is not reproduced on the viewer's display and that therefore may be used for signaling. Thus the closed caption data stream from a given programming event provider may incorporate timing signals that are used by client devices to accurately determine the beginning and ending time of each programming event. In accordance with alternative embodiments, timing information may be included in the video signal itself. For example, in analog video signals the timing information may be included in a vertical blanking interval. In digital video signals the timing information may be provided in a data field of the digital video signal.

In a first preferred embodiment, a closed caption data stream includes a programming event identifier that is synchronized with the beginning of the corresponding programming event. FIG. 20 shows an example of a closed caption data stream in accordance with the preferred embodiment. In the closed caption data stream, text corresponding to a programming event designated as "PE 1" (programming event 1) precedes text corresponding to a following programming event designated as "PE 2" (programming event 2). Immediately prior to the text data for PE 2 is an identifier for programming event 2. The identifier is preferably the same identifier for programming event 2 that is used in metadata for programming event 2 previously supplied to client devices, and may be obtained through interaction with a local or remote metadata generator. However, other types of identifiers may be used so long as they can be recognized by client devices as relating to a particular programming event. The timing data is preferably accompanied by a marker that identifies it as timing data, and the timing data is preferably encrypted.

As an alternative to the arrangement of timing data shown in FIG. 20, timing data may be embedded in the closed caption data stream at a location prior to the beginning of a programming event in order to afford sufficient set-up time for recording in the client device. For example, the timing data may be located at a fixed time prior to commencement of the programming event, for example, five seconds before the programming event. Alternatively, the timing data may be located at an arbitrary time prior to the programming event and may include information indicating the amount of time remaining before the beginning of the corresponding programming event.

As an enhancement to the aforementioned preferred embodiments, the closed caption data may also include timing data that corresponds to the end of a programming event. As with the beginning timing data, the end timing data may comprise an identifier located at the end of the programming event, or at a fixed or specified time prior to the end of the programming event. The timing data indicating the end of the programming event may be timing data specifically defined as end point identifying timing data of the programming event being recorded, or it may be timing data indicating the beginning of the next programming event. As a further enhancement, the closed caption timing data may include timing data indicating beginnings and endings of individual segments within a programming event. For example, where a programming event to be recorded is a television program that includes commercial breaks, the closed caption timing data may indicate points at which commercial breaks begin and end so that a recording device can use the timing data to exclude the commercial portions from recording, delete the commercial portions subsequent to recording, or skip the commercial portions during playback.

Thus in accordance with preferred embodiments of the invention, a process for producing closed caption data including programming event timing data of the types described above or other alternative types may be implemented in a video production facility to produce closed caption data including timing data at the time of production of the video program. Generally, script data is received for a video program. Identifiers of individual programming events within the program are then determined. This may be done using the script data and other production data in a metadata generation process such as the metadata generation processes described above. Closed caption data is then produced for the program. The closed caption data includes text data corresponding to the script data, and timing data. The timing data is provided at locations within the closed caption data that correspond to the beginnings of each programming event within the program, and the timing data for each programming event includes the identifier of that programming event. Additional closed caption timing data may also be provided at locations corresponding to the ends of programming events and to the beginnings and endings of segments within programming events. The producer may further provide synchronized transmission of the closed caption data and programming events, or may store the programming events and closed caption data on a machine readable storage medium.

In accordance with alternative embodiments of the invention, a process for producing a video signal including programming event timing data of the types described above or other alternative types may be implemented in a video production facility to produce a video signal including timing data at the time of production of the video program. Generally, the beginnings of programming events within the program and identifiers of each programming event are determined. This may be done using script data and other production data in a metadata generation process such as the metadata generation processes described above. A video signal is then produced for the program. The video signal includes timing data that is provided at locations within the video signal at locations that correspond to the beginnings of each programming event within the program, and the timing data for each programming event includes the identifier of that programming event. Additional timing data may also be provided at locations corresponding to the ends of programming events and to the beginnings and endings of segments within programming events.

In a further embodiment, the production of closed caption timing data is implemented in a manner that is preferred for providing enhanced synchronization for video programs, and particularly for "live" video programs and other programs produced using a teleprompter. In such video programs, the exact timing of transitions between programming events within the program can depends on the rate at which narration within each programming event occurs. For example, the length of segments of a news program depends on the rate at which a news anchor reads the text of each segment. FIG. 21 illustrates basic components of a video production system in accordance with preferred embodiments for enhancing synchronization with client devices. The video production system includes a video source 242 for providing the program video signal 244. The system further includes a closed caption data source 246 for providing a closed caption data stream 248 including closed caption text data and timing data such as the timing data described above. The closed caption data and video signal are provided to a storage device or a transmission medium 250. In addition, the system includes a teleprompter system 252 that displays text to be read during the production of the video program, such as by news anchors or actors. The teleprompter text is generally prepared in advance of the program and in typical implementations the teleprompter text and the closed caption text are prepared from the same source and are therefore identical or very similar. The teleprompter displays text in a scrolling fashion that is regulated in accordance with the rate at which the text is being read. Thus in typical teleprompter system implementations the scrolling of the teleprompter text is used to trigger corresponding portions of the closed caption text data, thereby producing a high degree of synchronization between the audio portion of the program and the corresponding closed caption text data. In accordance with preferred embodiments of the invention as illustrated in FIG. 21, the closed caption data source provides text 254 for display by the teleprompter system 252, and the teleprompter system 252 provides a trigger signal 256 to trigger the transmission of portions of closed caption data that includes timing data such as the various types of timing data described above. This provides a high degree of synchronization between the timing data and transitions between programming events.

Thus in accordance with preferred embodiments of the invention, a process for generating closed caption data for a video program generally involves producing closed caption data comprising timing data and text data and producing a video signal for the video program. The locations of timing data within the closed caption data may correspond to beginnings or endings of programming events within the video program, and the closed caption data is synchronized to the video signal in accordance with the display of corresponding data by a teleprompter system used in producing the video program. The synchronized video signal and closed caption data may be transmitted to client video reception devices or stored on a machine readable storage medium.

The closed caption timing data described above may be used in client video devices for synchronizing recording of programming events to the reception of those programming events. Typically, the timing data represented in programming event metadata is used for determining a preferred programming event list, while the closed caption data stream is monitored for a period prior to the anticipated commencement of a programming event to detect closed caption timing data signifying the actual beginning of the programming event. The closed caption data stream may also be monitored during reception of the programming event to detect further timing data signifying an end point of the programming event or points at which recording should be paused or reinitiated after pausing. A process for selectively recording programming events as illustrated in FIG. 22 may therefore be implemented in a video recording device. Initially a programming event to be recorded is determined (258). The programming event to be recorded may be determined from a recording schedule based on the current time maintained by the recording device. Timing data associated with the programming event is then identified (260) in a closed caption data stream received by the recording device. In some instances it may be necessary for the recording device to tune to the channel of the programming event in advance of the beginning of the programming event in order to receive the closed caption data stream of that channel so that the timing information indicating the beginning of the programming event may be detected. The recording device may then control (262) recording of the programming event in accordance with the timing data. Such control may include initiating recording, pausing recording, reinitiating recording after pausing, or terminating recording.

In alternative embodiments, timing data incorporated directly into the video signal as described above may be used in a similar manner in a recording device by detecting the timing data within the video signal rather than within closed caption data.

Where the timing data comprises a simple identifier located at the beginning of the programming event, delays in commencing recording upon receipt of the timing data may be resolved through buffering of the video stream in the client device. Such delays may be avoided through the use of timing data that is located prior to the beginning of the programming event by a predetermined or specified distance as described above.

Alternative embodiments of the invention may employ different methods of using closed caption timing data or timing data provided within the video to synchronize recording to programming event transmission. For example, a recording device may begin recording the channel of a programming event in advance of the beginning of the programming event, and subsequently delete material recorded prior to the beginning of the programming event indicated by the corresponding timing data. Material recorded after the end of the programming event or during commercial breaks or other segments indicated by the timing data may be determined and deleted in a similar fashion.

In still further embodiments, timing data as described above may simply be recorded in the closed caption data stream accompanying the programming event or in the video signal itself, and used later by the device to control playback, such as by beginning playback in accordance with timing data indicating the beginning of the programming event, skipping portions such as commercial breaks indicated by the timing data, and ending playback in accordance with timing data indicating the end of the programming event.

In still further embodiments, additional information may accompany the timing information in the closed caption data or video signal.

Figure 23:
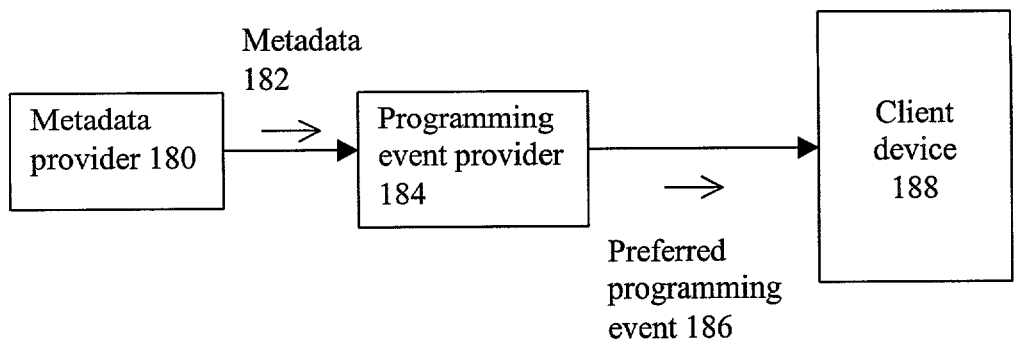
FIG. 23 illustrates a system for providing programming events in accordance with an embodiment of the invention.

Although the scoring and scheduling processes described above are presented in the context of a client device that analyzes metadata for purposes of identifying upcoming programming events to be recommended or recorded, alternative embodiments of the invention may implement the scoring and scheduling processes in a server of a programming event distribution system that analyzes programming events to determine programming events of interest to particular viewers so that those programming events can be recommended for transmission or automatically transmitted. Such a system is illustrated in FIG. 23, in which a metadata distributor 180 supplies metadata 182 to a programming event provider 184, which in turn supplies preferred programming events 186 to a client device 188. In embodiments of this system, the client device may be a set top box, a computer, or a television. The programming event provider may be a broadcast, cable, or satellite television provider system, or an internet server or video server. The programming event provider is typically implemented as a computing device including a processor or processors to execute programming instructions and memory coupled to the processor(s) and containing programming instructions for instantiating a programming event provider system providing programming event scoring and transmission as described further below.

Figure 24:
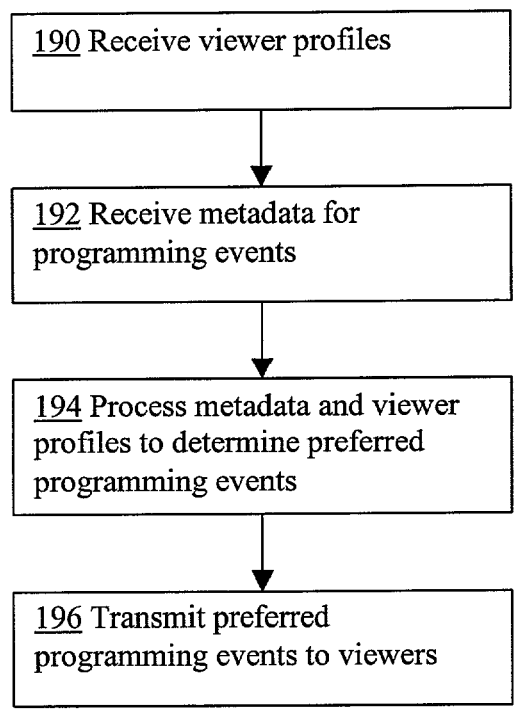
FIG. 24 illustrates a process in a system such as the system shown in FIG. 23.

The programming event provider system may perform scoring or scheduling processes as described above to assign scores to programming events using programming event metadata and viewer profiles provided by one or more consumers. For example, as shown in FIG. 24, the programming event provider may receive one or more viewer profiles from viewers (190). The viewer profiles may be provided, for example, by client devices. As described above, the viewer profiles include preference scores associated with categories of a classification hierarchy. The programming event provider also receives metadata for one or more programming events (192). As described above, the metadata includes goodness of fit scores for categories of the classification hierarchy. Metadata for programming events is processed using the viewer profiles to determine preferred programming events (194). In various embodiments, the metadata may be processed using a single viewer profile to determine preferred programming events for one viewer or a groups of viewers, or the metadata may be processed using multiple viewer profiles to determine preferred programming events for a group of viewers. Preferred programming events are then transmitted to the one or more viewers (196). Transmissions may be provided in accordance with a preferred programming event schedule as described above. Alternatively, an index of preferred programming events may be made accessible to viewer to allow viewers to select programming events for transmission.

Further alternative embodiments of the invention may implement a programming event scoring process in a server that analyzes programming events to determine programming events of particular interest to a viewer and provides alerts regarding the programming events to the viewer through a communication device such as a pager, email, instant messaging, telephone, or wireless communication device to alert the viewer to the availability of the programming event, and to provide related information such as the time and channel of the programming event and a description of the programming event.

Figure 25:
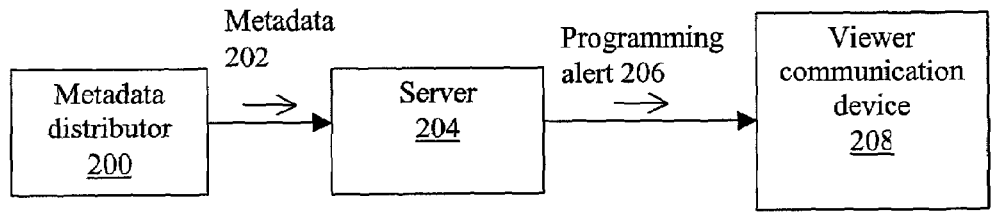
FIG. 25 illustrates a system for providing alerts regarding programming events to viewers in accordance with an embodiment of the invention.
Figure 26:
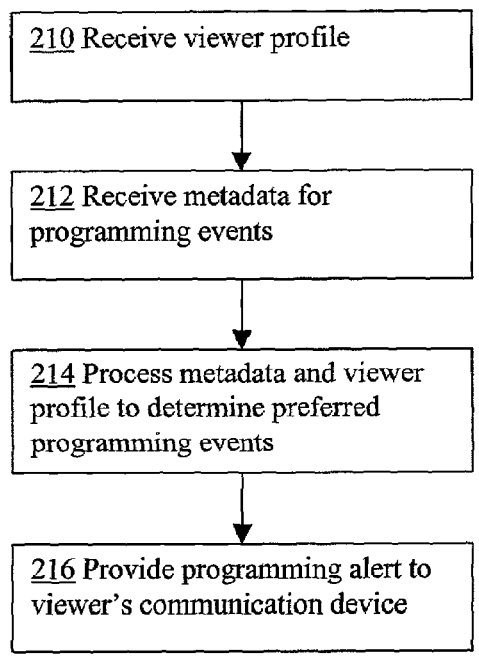
FIG. 26 illustrates a process in a system such as the system shown in FIG. 25.

Such a system is illustrated in FIG. 25, in which a metadata distributor 200 supplies metadata 202 to a server 204, which determines preferred programming events in accordance with a viewer profile and communicates programming alerts 206 to a communication device 208 of the viewer. The communication device may for example be a pager, cell phone, wireless communication device, telephone or computer. The server may perform scoring processes as described above to assign scores to programming events using programming event metadata and a viewer profile provided by the viewer. For example, as shown in FIG. 26, the programming event provider may receive a viewer profile from a viewer (210). A viewer may provide a viewer profile, for example, by transmitting a previously established viewer profile to the server through the internet, or by accessing the server through the internet and filling a form to provide appropriate viewer profile information. As described above, the viewer profile may include preference scores associated with categories of a classification hierarchy. The viewer profile preferably contains contact information, such as an email address or pager number, for indicating where an alert should be sent for that viewer. The programming event provider also receives metadata for one or more programming events (212). As described above, the metadata may include goodness of fit scores for categories of the classification hierarchy. Metadata for programming events is processed using the viewer profile to determine preferred programming events (214). An alert is then provided to the viewer's communication device (216). In preferred embodiments the alert is provided to the viewer's communication device using contact information such as an email address or pager address that is included in the viewer profile. The alert may be in the form of a text message for viewing, or in the case of wireless communication devices such as digital cellular telephones, the alert may be provided as a computer-generated spoken message. The manners of transmitting data from a server to various communication devices as described above is known in the art. The time at which the alert is provided is preferably determined through reference to the time of the preferred programming event and information in the viewer profile specifying an amount of time in advance for providing alerts.

Although the processing of the aforementioned embodiment is described as occurring in a server, alternative embodiments may locate the same processing in a viewer's client device, such that the client device receives metadata and processes the metadata to provide programming alerts to a viewer's communication device. The client device in accordance with such embodiments will include an appropriate interface for providing the programming alerts through a desired communication system.

In further alternative embodiments, systems and processes as discussed above may be applied to programming events involving other types of media. For example, metadata may be generated for audio programs or segments of audio programs, and the metadata may be analyzed using viewer profiles to determine an alert list or programs to be recorded. Analogous processes may be applied to other media such as electronic print media.

While the embodiments described herein include various combinations of features, those features may characterize further embodiments of the invention individually or in other combinations, and thus it will be apparent to those having ordinary skill in the art that the system features and processing tasks described herein are not necessarily exclusive of other features and processing tasks, nor required to exist in only those combinations particularly described, but rather that further alternative combinations may be implemented and that additional features and tasks may be incorporated in accordance with particular applications. Therefore it should be understood that the embodiments described herein are offered by way of example only. The invention is not limited to these particular embodiment, but extends to various modifications, combinations, and permutations that fall within the scope and spirit of the appended claims.

What is claimed is:

1. A method for generating metadata describing a video program, the method comprising:
   obtaining, by a programmable device, production data corresponding to the video program from a production system used in the production of the video program;
   assigning, by the programmable device, respective numerical goodness of fit scores to respective predefined categories based on analysis of the production data to describe the subject matter of the video program, wherein the numerical goodness of fit score assigned to a category represents a degree to which the category is descriptive of the subject matter of the video program;
   assigning, by the programmable device, keywords to the video program based on analysis of the production data; and
   storing, by the programmable device, numerical goodness of fit scores and keywords for the video program in a computer readable medium in association with time data and descriptive data for the video program as metadata describing the video program;
   wherein said predefined categories are subject matter categories in a hierarchy comprising at least a set of top level categories, respective sets of first level sub-categories each corresponding to and encompassed by a top level category, and respective sets of second level sub-categories each corresponding to and encompassed by a first level sub-category.

2. The method claimed in claim 1, wherein assigning keywords comprises:
   determining respective numerical goodness of fit scores corresponding to said categories for each of candidate keywords; and
   determining a representative subset of said candidate keywords by a thresholding procedure using said numerical goodness of fit scores for said candidate keywords.

3. The method claimed in claim 1, further comprising determining a representative subset of said numerical goodness of fit scores, and
   wherein storing numerical goodness of fit scores comprises storing said representative subset of said numerical goodness of fit scores.

4. The method claimed in claim 1, wherein the production data comprises rundown data produced by the production system.

5. The method claimed in claim 1, wherein the production data comprises script data produced by the production system.

6. The method claimed in claim 1, wherein storing keywords comprises selecting a predetermined number of said assigned keywords for storage.

7. A system for generating metadata describing a video program, the system comprising:
   a programmable device including a computer readable medium storing programming code to control the device to perform processing comprising:
      obtaining, by a programmable device, production data corresponding to the video program from a production system used in the production of the video program;
      assigning, by the programmable device, respective numerical goodness of fit scores to respective predefined categories based on analysis of the production data to describe the subject matter of the video program, wherein the numerical goodness of fit score assigned to a category represents a degree to which the category is descriptive of the subject matter of the video program;
      assigning, by the programmable device, keywords to the video program based on analysis of the production data;
   storing, by the programmable device, numerical goodness of fit scores and keywords for the video program in association with time data and descriptive data for the video program as metadata describing the video program; and
   wherein said predefined categories are subject matter categories arranged in a hierarchy comprising at least a set of top-level categories, respective sets of first level sub-categories each corresponding and encompassed by a top level category, and respective sets of second level sub-categories each corresponding to and encompassed by a first level sub-category.

8. The system claimed in claim 7, wherein assigning keywords comprises:
   determining respective numerical goodness of fit scores corresponding to said categories for each of candidate keywords; and
   determining a representative subset of said candidate keywords by a thresholding procedure using said numerical goodness of fit scores for said candidate keywords.

9. The system claimed in claim 7, said processing further comprising determining a representative subset of said numerical goodness of fit scores, and
   wherein storing numerical goodness of fit scores comprises storing said representative subset of said numerical goodness of fit scores.

10. The system claimed in claim 7, wherein the production data comprises rundown data produced by the production system.

11. The system claimed in claim 7, wherein the production data comprises script data produced by the production system.

12. The system claimed in claim 7, wherein storing keywords comprises selecting a predetermined number of said assigned keywords for storage.

13. A method in a programmable device for generating metadata describing a programming event, the method comprising:

obtaining production data corresponding to the programming event from a production system used in the production of the programming event, the production data including descriptive information for the programming event;

determining candidate keywords from the production data;

providing the candidate keywords as respective inputs to a classification tool and generating for each of said candidate keywords a set of numerical goodness of fit scores each corresponding to a predefined subject matter category, wherein the numerical goodness of fit score corresponding to a category represents a degree to which the category is descriptive of the candidate keyword;

selecting keywords to represent the programming event from among said candidate keywords based on the set of numerical goodness of fit scores for each of said candidate keywords; and storing said selected keywords in a computer readable medium as a component of said metadata describing the programming event; and wherein said predefined categories are subject matter categories arranged in a hierarchy comprising at least a set of top level categories, respective sets of first level-categories each corresponding and encompassed by a top level category, and respective sets of second level sub-categories each corresponding to and encompassed by a first level sub-category.

14. The method claimed in claim 13, wherein determining candidate keywords comprise identifying verbs and nouns in said production data and using said verbs and nouns as candidate key words.

15. The method claimed in claim 13, wherein selecting keywords is preceded by:

determining correlations between sets of numerical goodness of fir scores generated from said candidate keywords and a set of numerical goodness of fit scores generated by providing said descriptive information for the programming event as input to said classification tool; and discarding candidate keywords having low correlation.

16. The method claimed in claim 13, wherein selecting keywords comprises eliminating candidate keywords by a thresholding process using a highest numerical goodness of fit score associated with each candidate keyword.

17. The method claimed in claim 13, wherein said production data comprises at least one of rundown data and script data for the programming event.

18. The method claimed in claim 13, wherein said production data further comprises timing data, wherein determining candidate keywords is preceded by determining a time and a duration of individual segments of a program described by the production data, and wherein said candidate keywords are generated using production data that is specific to an individual segment of said program such that the candidate keywords are descriptive of that individual segment.

19. A programmable device for generating metadata for transmission to a programming event receiver, the metadata describing a programming event, the device comprising a computer readable medium storing programming code for controlling the device to perform processing comprising:

obtaining production data corresponding to the programming event from a production system used in the production of the programming event, the production data including descriptive information for the programming event;

determining candidate keywords from the production data;

providing the candidate keywords as respective inputs to a classification tool and generating for each of said candidate keywords a set of numerical goodness of fit scores each corresponding to a predefined subject matter category, wherein the numerical goodness of fit score corresponding to a category represents a degree to which the category is descriptive of the candidate keyword;

selecting keywords to represent the programming event from among said candidate keywords based on the set of numerical goodness of fit scores for each of said candidate keywords; and storing said selected keywords in a computer readable medium as a component of said metadata describing the programming event; and wherein said predefined categories are subject matter categories arranged in a hierarchy comprising at least a set of top-level categories, respective sets of first level sub-categories each corresponding to and encompassed by a top level category, and respective sets of second level sub-categories each corresponding to and encompassed by a first level sub-category.

20. The device claimed in claim 19, wherein determining candidate keywords comprise identifying verbs and nouns in said production data and using said verbs and nouns as candidate key words.

21. The device claimed in claim 19, wherein selecting keywords is preceded by:

determining correlations between sets of numerical goodness of fit scores generated from said candidate keywords and a set of numerical goodness of fit scores generated by providing said descriptive information for the programming event as input to said classification tool; and discarding candidate keywords having low correlation.

22. The device in claim 19, wherein selecting keywords comprises eliminating candidate keywords by a thresholding process using a highest numerical goodness of fit score associated with each candidate keyword.

23. The device claimed in claim 19, wherein said production data comprises at least one of rundown data and script data for the programming event.

24. The device claimed in claim 19, wherein said production data further comprises timing data, wherein determining candidate keywords is preceded by determining a time and a duration of individual segments of a program described by the production data, and wherein said candidate keywords are generated using production data that is specific to an individual segment of said program such that the candidate keywords are descriptive of that individual segment.

25. A method for generating metadata describing the subject matter of individual segments of a video program, the method comprising:

obtaining, by a programmable device, production data corresponding to the video program from a production system used in the production of the video program;

processing, by the programmable device, the production data to determine individual segments of the video program prior to broadcast of the video program;

for each segment of the video program, the programmable device:

assigning respective numerical goodness of fit scores to respective predefined categories based on analysis of the production data to describe the subject matter of the segment of the video program, wherein the numerical goodness of fit score assigned to a category represents a degree to which the category is descriptive of the subject matter of the segment of the video program;

assigning keywords to the segment of the video program based on analysis of the production data; and storing numerical goodness of fit scores and keywords for the segment of the video program in a computer readable medium in association with time data and descriptive data for the segment of the video program as metadata describing the segment of the video program; and wherein said predefined categories are subject matter categories arranged in a hierarchy comprising at least a set of top-level categories, respective sets of first level sub-categories each corresponding to and encompassed by a top level category, and respective sets of second level sub-categories each corresponding to and encompassed by a first level sub-category.

26. The method claimed in claim 25, further comprising determining a representative subset of said numerical goodness of fit scores, and wherein storing numerical goodness of fit scores comprises storing said representative subset of said numerical goodness of fit scores.

27. The method claimed in claim 25, wherein the production data comprises rundown data produced by the production system.

28. The method claimed in claim 25, wherein the production data comprises script data produced by the production system.

29. A system for generating metadata describing the subject matter of individual segments of a video program, the system comprising:

a programmable device including a computer readable medium storing programming code to control the programmable device to perform processing comprising:

obtaining, by a programmable device, production data corresponding to the video program from a production system used in the production of the video program;

processing, by the programmable device, the production data to determine individual segments of the video program prior to broadcast of the video program;

for each segment of the video program, the programmable device:

assigning respective numerical goodness of fit scores to respective predefined categories based on analysis of the production data to describe the subject matter of the segment of the video program, wherein the numerical goodness of fit score assigned to a category represents a degree to which the category is descriptive of the subject matter of the segment of the video program;

assigning keywords to the segment of the video program based on analysis of the production data; and storing numerical goodness of fit scores and keywords for the segment of the video program in a computer readable medium in association with time data and descriptive data for the segment of the video program as metadata describing the segment of the video program; and wherein said predefined categories are subject matter categories arranged in a hierarchy comprising at least a set of top-level categories, and respective sets of first level sub-categories each corresponding to and encompassed by a top level category, and respective sets of second level sub-categories each corresponding to and encompassed by a first level sub-category.

30. The system claimed in claim 29, said processing further comprising determining a representative subset of said numerical goodness of fit scores, and wherein storing numerical goodness of fit scores comprises storing said representative subset of said numerical goodness of fit scores.

31. The system claimed in claim 29, wherein the production data comprises rundown data produced by the production system.

32. The system claimed in claim 29, wherein the production data comprises script data produced by the production system.

* * * * *